(12) United States Patent
Ogata et al.

(10) Patent No.: US 8,202,197 B2
(45) Date of Patent: Jun. 19, 2012

(54) HYDRAULIC PRESSURE CONTROL APPARATUS

(75) Inventors: Yusuke Ogata, Toyota (JP); Toshihiro Aoyama, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 519 days.

(21) Appl. No.: 12/429,481

(22) Filed: Apr. 24, 2009

(65) Prior Publication Data

US 2009/0266429 A1 Oct. 29, 2009

(30) Foreign Application Priority Data

Apr. 24, 2008 (JP) ................................. 2008-113655

(51) Int. Cl.
*F16H 15/38* (2006.01)
*F16H 61/664* (2006.01)
*F16H 61/38* (2006.01)
*F16H 61/26* (2006.01)

(52) U.S. Cl. ............................. 477/50; 477/52; 477/156

(58) Field of Classification Search .................... 477/50, 477/52, 156, 158
See application file for complete search history.

(56) References Cited

U.S. PATENT DOCUMENTS 6,086,513 A * 7/2000 Tominaga ..................... 477/169
7,582,042 B2 9/2009 Sato et al.

FOREIGN PATENT DOCUMENTS

| DE | 10043713 A1 | 3/2002 |
|----|----|----|
| JP | 59099164 | 6/1984 |
| JP | 10246306 | 9/1998 |
| JP | 2006177494 A | 7/2006 |
| JP | 2006349007 | 12/2006 |
| JP | 200707801 1 | 3/2007 |
| JP | 2007078011 | 3/2007 |
| JP | 2008051318 A | 3/2008 |

* cited by examiner

*Primary Examiner* — Tisha Lewis
(74) *Attorney, Agent, or Firm* — Gifford, Krass, Sprinkle, Anderson & Citkowski, P.C.

(57) ABSTRACT

A hydraulic pressure control apparatus includes a primary regulator valve that regulates a pressure discharged from an oil pump to form a line pressure that is used as an original pressure for a hydraulic pressure that is supplied to each element, and a secondary regulator valve that regulates a hydraulic pressure downstream of the primary regulator valve to form a secondary pressure. Two pilot pressures (first modulator hydraulic pressure, control hydraulic pressure from a duty solenoid) are supplied to the secondary regulator valve. The secondary regulator valve is configured in such a manner that when one of the pilot pressures changes, a change in the one of the pilot pressures is absorbed by the other pilot pressure.

10 Claims, 6 Drawing Sheets

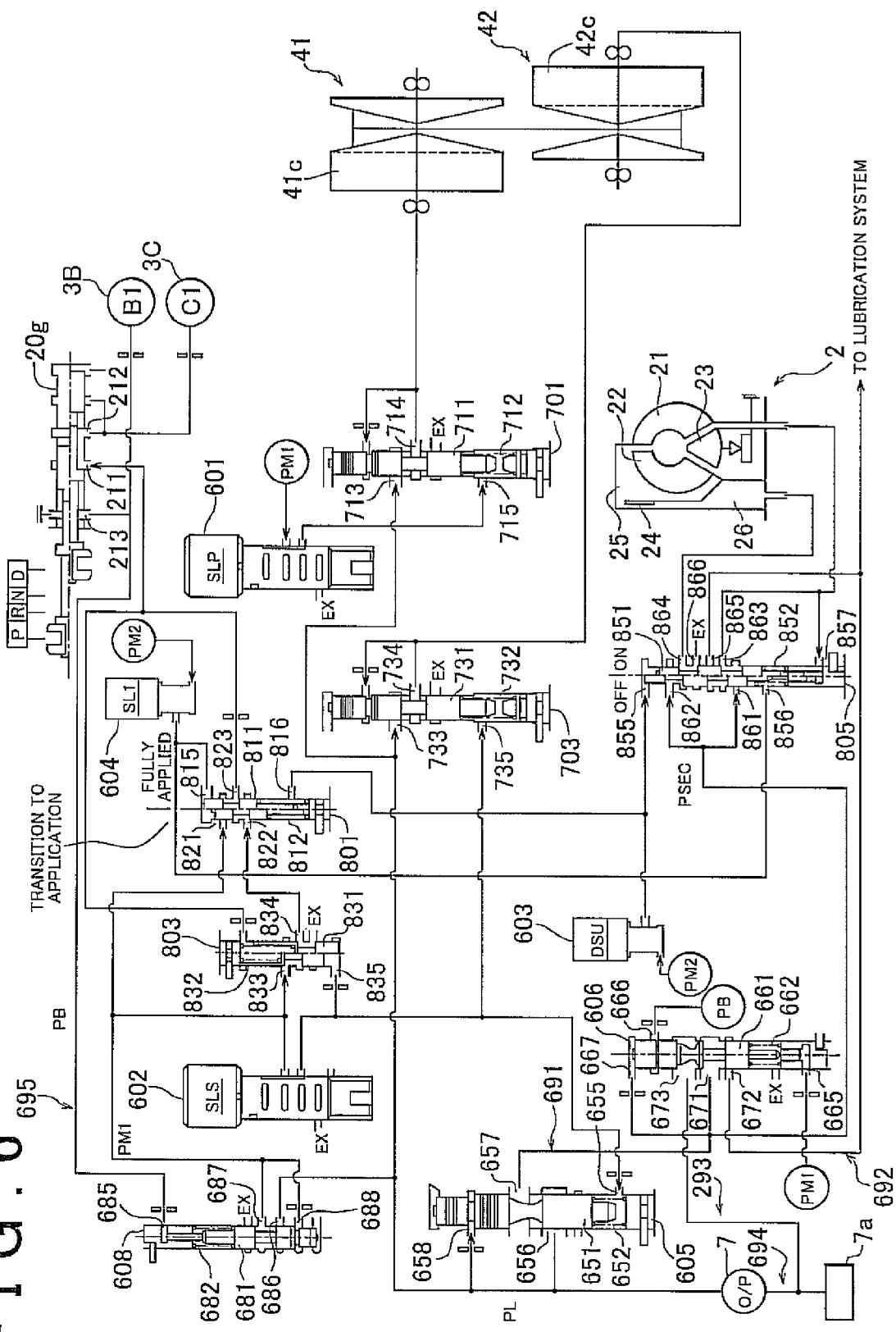

HYDRAULIC PRESSURE CONTROL APPARATUS

INCORPORATION BY REFERENCE

The disclosure of Japanese Patent Application No. 2008-113655 filed on Apr. 24, 2008 including the specification, drawings and abstract is incorporated herein by reference in its entirety.

BACKGROUND OF THE INVENTION

1. Field of the Invention

The invention relates to a hydraulic pressure control apparatus for a vehicle power transmission system.

2. Description of the Related Art

There is a hydraulic pressure control apparatus for a vehicle power transmission system, which includes a first regulation unit (primary regulator valve) and a second regulation unit (secondary regulator valve) (refer to, for example, Japanese Patent Application Publication No. 2007-78011 (JP-A-2007-78011)). The primary regulator valve regulates the hydraulic pressure generated by an oil pump (discharge pressure) to form a line pressure that is used as the original pressure (control original pressure) for the hydraulic pressure that is supplied to each element. The secondary regulator valve is provided downstream of the primary regulator valve, and regulates the hydraulic pressure discharged from the primary regulator valve to form a secondary pressure. The secondary pressure formed by the secondary regulator valve is applied to, for example, a control valve that is actuated to apply or release a lockup clutch of a fluid power transmission unit (torque converter) provided in the vehicle power transmission system.

In an existing hydraulic pressure control apparatus, a secondary regulator valve is configured in such a manner that only one pilot pressure is introduced into the secondary regulator valve. That is, the secondary regulator valve is configured to form the secondary pressure using only one pilot pressure. Therefore, if the pilot pressure changes, the secondary pressure also changes. As a result, the durability of a torque converter may be reduced due to an increase in the secondary pressure, or the degree of application of a lockup clutch may be reduced due to a decrease in the secondary pressure.

SUMMARY OF THE INVENTION

The invention relates to a hydraulic pressure control apparatus that minimizes the influence of a change in a pilot pressure that is supplied to a secondary regulator valve.

An aspect of the invention relates to a hydraulic pressure control apparatus which includes a first regulation unit that regulates a pressure discharged from an oil pump to form a line pressure that is used as an original pressure for a hydraulic pressure that is supplied to each element, and a second regulation unit that is provided downstream of the first regulation unit, and that regulates a hydraulic pressure downstream of the first regulation unit to form a secondary pressure. At least two pilot pressures are supplied to the second regulation unit. The second regulation unit is configured in such a manner that when one of the pilot pressures changes, a change in the one of the pilot pressures is absorbed by the other pilot pressure. More specifically, the second regulation unit includes a spool that is moved based on the pilot pressures and a hydraulic pressure that is supplied to a port which is communicated with an oil passage located downstream of the first regulation unit, and when the one of the pilot pressures changes, the other pilot pressure changes in such a manner that a change in a resultant of the pilot pressures applied to the spool is minimized.

With the configuration described above, even if one of the pilot pressures changes, the influence of the change is minimized, and a change in the secondary pressure that is formed by the secondary regulator unit is minimized. Thus, it is possible to minimize reduction in the durability of a fluid power transmission unit (torque converter) provided in a vehicle power transmission system, which is caused due to an increase in the secondary pressure, and to minimize reduction in the degree of application of a lockup clutch of the torque converter, which is caused due to a decrease in the secondary pressure.

In the aspect of the invention described above, the pilot pressures that are supplied to the second regulation unit may change in one of the following two modes 1) and 2).

1) When one of the pilot pressures and the other pilot pressure are applied to the spool in the same direction, the other pilot pressure decreases as the one of the pilot pressures increases. In this mode, even if one of the pilot pressures supplied to the second regulation unit changes, the change is absorbed by the other pilot pressure. That is, a decrease in one of the pilot pressures is compensated for by an increase in the other pilot pressure, and an increase in one of the pilot pressures is offset by a decrease in the other pilot pressure. Thus, when one of the pilot pressures changes, a change in the resultant of the pilot pressures applied to the spool is minimized, and a change in the secondary pressure that is formed by the second regulation unit is minimized.

2) When one of the pilot pressures and the other pilot pressure are applied to the spool in the opposite directions, the other pilot pressure increases as the one of the pilot pressures increases. In this mode, even if one of the pilot pressures supplied to the second regulation unit changes, the change is absorbed by the other pilot pressure. That is, a decrease in one of the pilot pressures is cancelled by a decrease in the other pilot pressure, and an increase in one of the pilot pressures is cancelled by an increase in the other pilot pressure. Thus, when one of the pilot pressures changes, a change in the resultant of the pilot pressures applied to the spool is minimized, and a change in the secondary pressure that is formed by the second regulation unit is minimized.

In the aspect of the invention described above, the following combinations 1) and 2) may be employed as the combination of the pilot pressures applied to the second regulation unit.

1) The combination of the pilot pressures applied to the second regulation unit may be a combination of an application maintaining hydraulic pressure that is supplied to a hydraulically-driven friction application element, which is applied to form a power transmission path when a vehicle moves, when the hydraulically-driven friction application element is fully applied, and a control hydraulic pressure from an electromagnetic valve that controls an application pressure for a hydraulically-driven lockup clutch that is provided for a fluid power transmission unit provided between a power source and an automatic transmission and that directly connects a power source-side portion and an automatic transmission-side portion of the fluid power transmission unit to each other.

2) The combination of the pilot pressures applied to the second regulation unit may be a combination of an application maintaining hydraulic pressure that is supplied to a first hydraulically-driven friction application element, which is applied to form a power transmission path when a vehicle moves forward, when the first hydraulically-driven friction application element is fully applied, and a hydraulic pressure that is supplied to a second hydraulically-driven friction application element when the vehicle backs up.

In the aspect of the invention described above, the secondary pressure may be supplied to a control valve that is actuated when an application/release state of the lockup clutch is controlled. With this configuration, a change in the secondary pressure that is formed by the second regulation unit is minimized. Thus, it is possible to minimize reduction in the degree of application of the lockup clutch of the torque converter, which is caused due to a decrease in the secondary pressure, and reduction in the durability of the torque converter due to an increase in the secondary pressure.

In the aspect of the invention described above, the application maintaining hydraulic pressure may serve also as an original pressure for a linear electromagnetic valve provided in the hydraulic pressure control apparatus. With this configuration, it is possible to decrease the flow amount of hydraulic pressure consumed by linear electromagnetic valves, because the application maintaining hydraulic pressure is minimized. Thus, it is possible to enhance the flow amount balance of the oil pump, which contributes to downsizing of the oil pump.

In the aspect of the invention described above, an oil passage that is communicated with a drain port of the second regulation unit may be connected to an oil passage between the oil pump and an oil inlet. With this structure, because the hydraulic fluid is returned to the oil passage located upstream of the oil pump, it is possible to decrease intake resistance due to passage of the hydraulic fluid through a strainer provided at the oil inlet, and to suppress development of cavitation.

According to the aspect of the invention described above, even if one of the pilot pressures supplied to the second regulation unit changes, the influence of the change is minimized. As a result, a change in the secondary pressure formed by the second regulation unit is minimized.

BRIEF DESCRIPTION OF THE DRAWINGS

The features, advantages and technical and industrial significance of this invention will be described in the following detailed description of example embodiments of the invention with reference to the accompanying drawings, wherein the same or corresponding portions will be denoted by the same reference numerals and wherein;

FIG. 6 is a circuit configuration diagram showing a hydraulic pressure control apparatus for the vehicle in FIG. 4.

DETAILED DESCRIPTION OF THE EXAMPLE EMBODIMENTS

Hereafter, example embodiments of the invention will be described with reference to the accompanying drawings.

Figure 1:
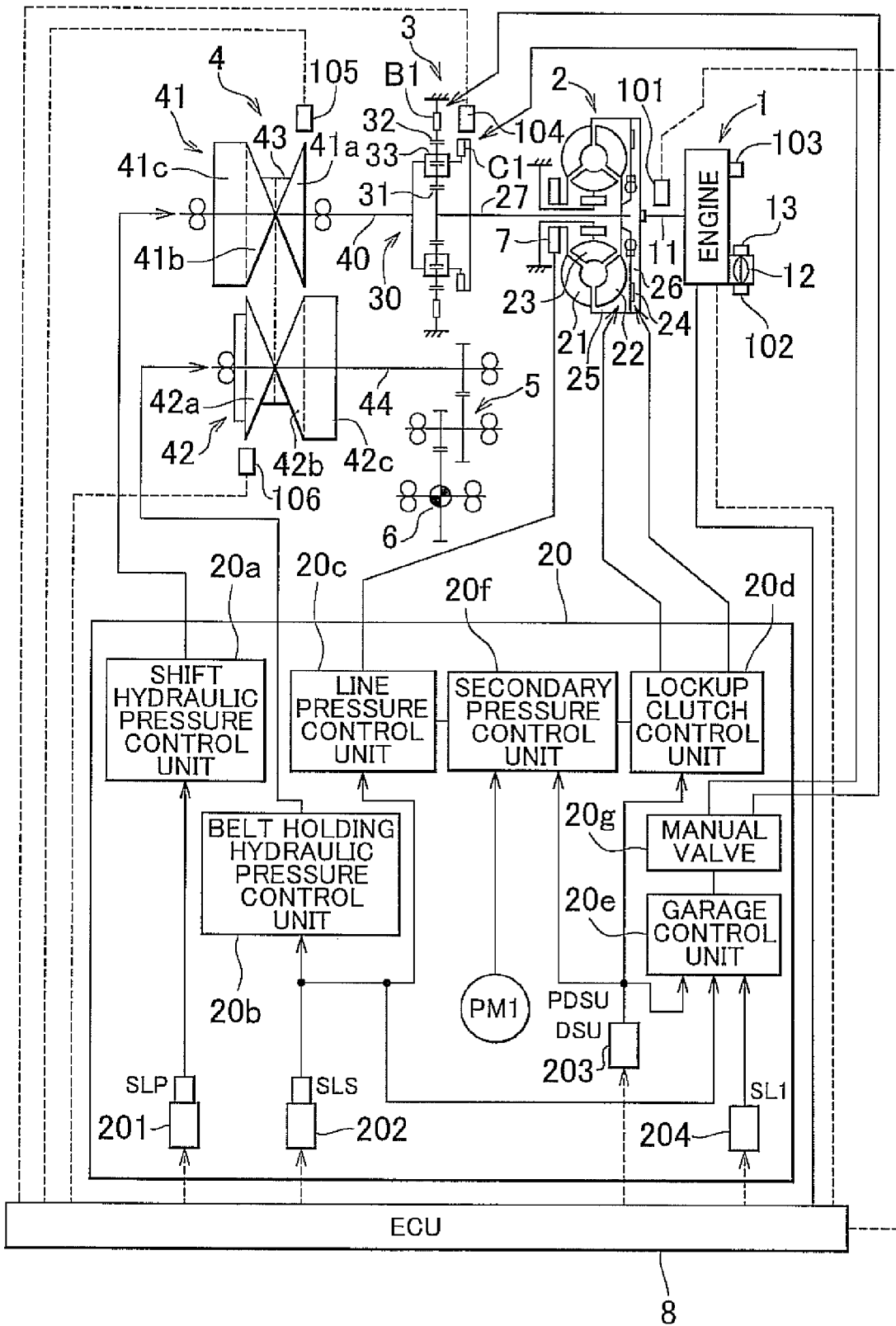
FIG. 1 is a view schematically showing the structure of a vehicle according to a first embodiment of the invention.

Hereafter, a first embodiment of the invention will be described. FIG. 1 is a view schematically showing the structure of a vehicle according to the first embodiment of the invention.

The vehicle shown in FIG. 1 is a front-engine front-drive (FF) vehicle, and includes an engine (internal combustion engine) 1 that is a power source for moving the vehicle, a torque converter 2 that is used as a fluid transfer unit, a forward/reverse switching unit 3, a belt continuously variable transmission (CVT) 4, a reduction gear unit 5, a differential gear unit 6, and an electronic control unit (ECU) 8 that serves as a control unit.

A crankshaft 11, which serves as an output shaft of the engine 1, is connected to the torque converter 2. The output from the engine 1 is transmitted from the torque converter 2 to the differential gear unit 6 via the forward/reverse switching unit 3, the belt continuously variable transmission 4 and the reduction gear unit 5, and then distributed between right and left drive wheels (not shown). In such a vehicle, the torque converter 2, the forward/reverse switching unit 3, the belt continuously variable transmission 4, etc. constitute a power transmission system.

The engine 1 is, for example, a multicylinder gasoline engine. The amount of air taken in the engine 1 is regulated by an electronically-controlled throttle valve 12. The opening mount of the throttle valve 12 (throttle opening amount) may be electronically controlled independently of an operation of an accelerator pedal performed by a driver. The throttle opening amount is detected by a throttle opening amount sensor 102. The temperature of a coolant for the engine 1 is detected by a coolant temperature sensor 103.

The throttle opening amount of throttle valve 12 is controlled by the ECU 8. More specifically, the ECU 8 controls the throttle opening amount of throttle valve 12 to achieve the optimum intake air amount (target intake air amount) based on the operating state of the engine 1 such as an engine speed Ne that is detected by an engine speed sensor 101, and an amount by which the accelerator pedal is depressed by the driver (accelerator pedal operation amount Acc). More specifically, the ECU 8 detects the actual throttle opening amount of throttle valve 12 with the use of the throttle opening amount sensor 102, and controls a throttle motor 13 of the throttle valve 12 in a feedback manner so that the actual throttle opening amount agrees with the throttle opening amount (target throttle opening amount) at which the target intake air amount is achieved.

The torque converter 2 includes a pump impeller 21 which is an input side portion, a turbine runner 22 which is an output side portion, and a stator 23 that performs the function of amplifying the torque. In the torque converter 2, power is transmitted between the pump impeller 21 and the turbine runner 22 via the fluid. The pump impeller 21 is connected to the crankshaft 11 of the engine 1. The turbine runner 22 is connected to the forward/reverse switching unit 3 via a turbine shaft 27.

The torque converter 2 is provided with a lockup clutch 24 that directly connects the input side portion and the output side portion of the torque converter 2 to each other. The lockup clutch 24 is fully applied, partially applied (applied in a slippage state) or fully released under the control over the application pressure for the lockup clutch 24, more specifically, under the control over the pressure difference between the hydraulic pressure in an application-side hydraulic chamber 25 and the hydraulic pressure in a release-side hydraulic chamber 26 (lockup pressure difference).

When the lockup clutch 24 is fully applied, the pump impeller 21 and the turbine runner 22 rotate together with each other. If the lockup clutch 24 is applied in a predetermined slippage state (partially applied state), the turbine runner 22 rotates in accordance with the rotation of the pump impeller 21 with a predetermined slippage caused when the torque converter 2 is driven. The lockup clutch 24 is released when the lockup pressure difference is brought to a negative value.

The torque converter 2 is provided with a mechanically-driven oil pump (hydraulic pressure generation source) 7 that is connected to the pump impeller 21.

The forward/reverse switching unit 3 includes a double-pinion planetary gear mechanism 30, a forward clutch C1, and a reverse brake B1.

A sun gear 31 of the planetary gear mechanism 30 is connected integrally with the turbine shaft 27 of the torque converter 2, and a carrier 33 is connected integrally with an input shaft 40 of the belt continuously variable transmission 4. The carrier 33 and the sun gear 31 may be connected to each other via the forward clutch C1, and a ring gear 32 may be fixed to a housing via the reverse brake B1.

The forward clutch C1 and the reverse brake B1 are hydraulically-driven friction application elements used to move the vehicle, which are applied or released by a hydraulic pressure control circuit 20, described later in detail. When the forward clutch C1 is applied and the reverse brake B1 are released, the forward/reverse switching unit 3 rotates together with the input shaft 40 to form a forward power transmission path. In this state, the drive power for moving the vehicle forward is transmitted toward the belt continuously variable transmission 4.

On the other hand, when the reverse brake B1 is applied and the forward clutch C1 is released, a reverse power transmission path is formed by the forward/reverse switching unit 3. In this state, the input shaft 40 rotates in the direction opposite to the direction of rotation of the turbine shaft 27. The drive power for causing the vehicle to back up is transmitted toward the belt continuously variable transmission 4. When the forward clutch C1 and the reverse brake B1 are both released, the forward/reverse switching unit 3 is placed in the neutral state (shut-off state) in which power transmission is shut off.

The belt continuously variable transmission 4 includes a primary pulley 41 which is an input portion, a secondary pulley 42 which is an output portion, and a metal belt 43 that is looped over the primary pulley 41 and the secondary pulley 42.

The primary pulley 41 is a variable pulley of which the effective diameter is variable. The primary pulley 41 is formed of a fixed sheave 41a that is fixed to the input shaft 40, and a movable sheave 41b that is provided in such a manner that the movable sheave 41b is able to slide with respect to the input shaft 40 only in the axial direction of the input shaft 40. Similarly, the secondary pulley 42 is a variable pulley of which the effective diameter is variable. The secondary pulley 42 is formed of a fixed sheave 42 that is fixed to an output shaft 44, and a movable sheave 42b that is provided in such a manner that the movable sheave 42b is able to slide with respect to the output shaft 44 only in the axial direction of the output shaft 44.

A hydraulic actuator 41c used to change the width of a V-shaped groove formed between the fixed sheave 41a and the movable sheave 41b is provided at the movable sheave 41b of the primary pulley 41. Similarly, a hydraulic actuator 42c used to change the width of a V-shaped groove formed between the fixed sheave 42a and the movable sheave 42b is provided at the movable sheave 42b of the secondary pulley 42.

In the belt continuously variable transmission 4, when the hydraulic pressure that is applied to the hydraulic actuator 41c of the primary pulley 41 (shift hydraulic pressure) is controlled, the widths of the V-shaped grooves of the primary pulley 41 and the secondary pulley 42 are changed and the effective diameter of the belt 43 is changed. As a result, a speed ratio γ (=primary pulley rotational speed (input shaft rotational speed) Nin/secondary pulley rotational speed (output shaft rotational speed) Nout) is continuously changed. The hydraulic pressure that is applied to the hydraulic actuator 42c of the secondary pulley 42 (belt holding hydraulic pressure) is controlled in such a manner that the belt 43 is held with a predetermined belt holding force that does not cause slippage of the belt 43. The shift hydraulic pressure and the belt holding hydraulic pressure are controlled by the ECU 8 and the hydraulic pressure control circuit 20.

As shown in FIG. 1, the hydraulic pressure control circuit 20 includes a shift hydraulic pressure control unit 20a that controls the hydraulic pressure that is applied to the hydraulic actuator 41c of the primary pulley 41 of the belt continuously variable transmission 4, a belt holding hydraulic pressure control unit 20b that controls the hydraulic pressure that is applied to the hydraulic actuator 42c of the secondary pulley 42, a line pressure control unit 20c that controls a line pressure PL used as the original pressure for the hydraulic pressure that is supplied to each element (control original pressure), a lockup clutch control unit 20d that controls the application/release state of the lockup clutch 24, a garage control unit 20e that controls the application/release state of the friction application elements (forward clutch C1, reverse brake B1), a secondary pressure control unit 20f that controls a secondary pressure PSEC, and a manual valve 20g. Control signals are transmitted from the ECU 8 to a linear solenoid (SLP) 201, a linear solenoid (SLS) 202, a duty solenoid (DSU) 203 for controlling the application pressure for the lockup clutch, and an ON-OFF solenoid (SL1) 204.

Figure 2:
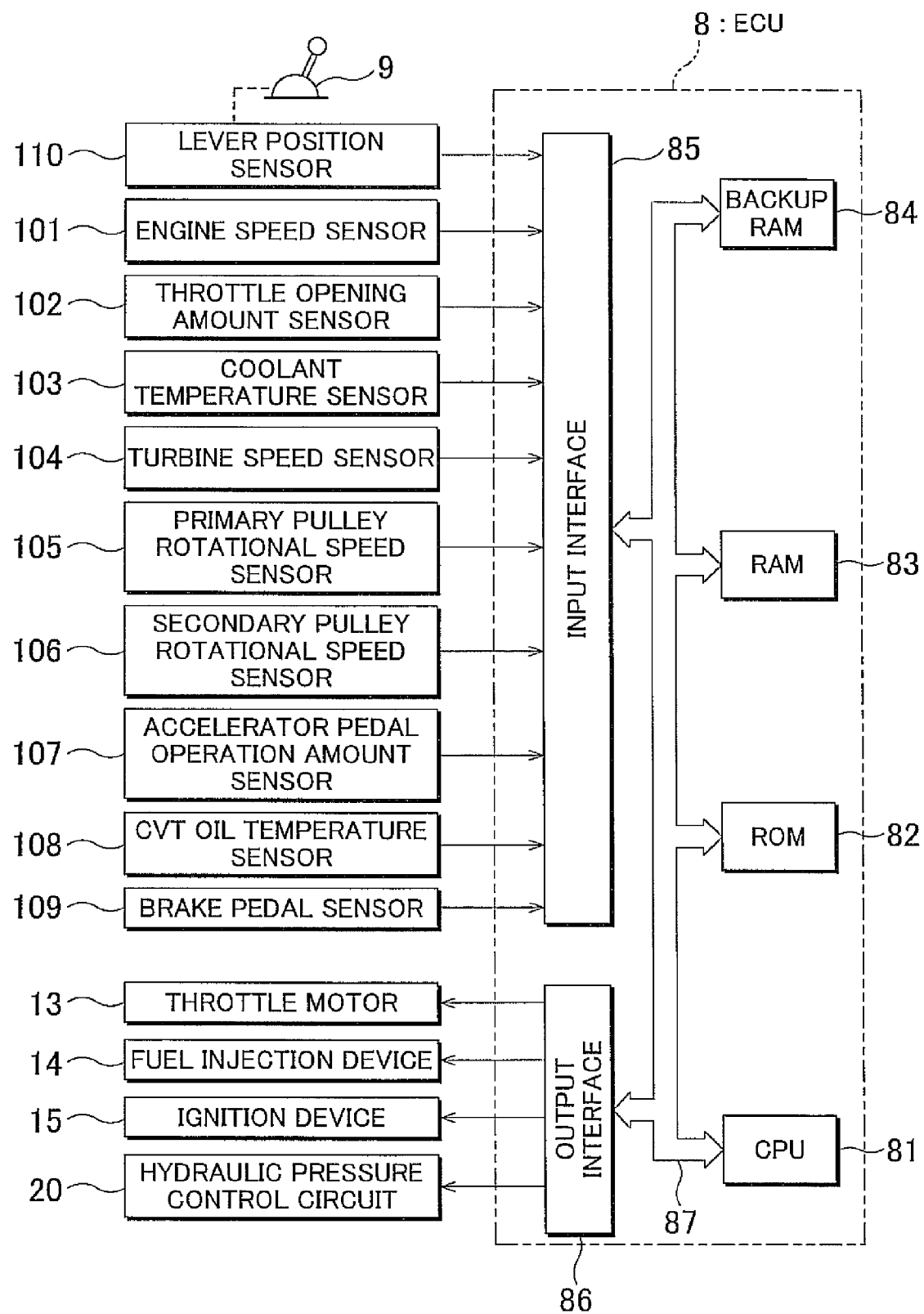
FIG. 2 is a block diagram showing the configuration of a control system, for example, an ECU of the vehicle in FIG. 1.

Next, the ECU 8 will be described in detail with reference to HG 2. As shown in FIG. 2, the ECU 8 includes a CPU 81, a ROM 82, a RAM 83, a backup RAM 84, etc.

The ROM 82 stores various control programs, and maps that are used to execute the various control programs, etc. The CPU 81 executes computations based on the various control programs and maps stored in the ROM 82. The RAM 83 is a memory device that temporarily stores the computation results obtained by the CPU 81 and the data transmitted from various sensors. The backup RAM 84 is a nonvolatile memory device that stores the data which should be stored, for example, when the engine 1 is stopped.

The CPU 81, the ROM 82, the RAM 83 and the backup RAM 843 are connected to each other via a bi-directional bus 87, and connected to an input interface 85 and an output interface 86.

Various sensors used to detect the operating state (cruise state) of the vehicle are connected to the input interface 85. More specifically, connected to the input interface 85 are the engine speed sensor 101, the throttle opening amount sensor 102, the coolant temperature sensor 103, a turbine speed sensor 104, a primary pulley rotational speed sensor 105, a secondary pulley rotational speed sensor 106, an accelerator pedal operation amount sensor 107, a CVT oil temperature sensor 108, a brake pedal sensor 109, and a lever position sensor 110 that detects the lever position (operated position) of a shift lever 9. The ECU 8 receives signals output from the above-mentioned various sensors, that is, signals that indicate a rotational speed Ne of the engine 1 (engine speed Ne), a throttle opening amount θth of the throttle valve 12, a coolant temperature Tw in the engine 1, a rotational speed Nt of the turbine shaft 27 (turbine speed), a rotational speed Nin of the primary pulley (rotational speed of input shaft), a rotational speed Nout of the secondary pulley Nout (rotational speed of output shaft), an operation amount Acc of the accelerator pedal (accelerator pedal operation amount), and an oil temperature in the hydraulic pressure control circuit 20 (CVT oil temperature Thc), a signal indicating whether a foot brake, which is a service brake, has been operated (whether the foot brake is applied or released), and a signal indicating the lever position (operated position) of the shift lever 9.

The throttle motor 13, a fuel injection device 14, an ignition device 15, and the hydraulic pressure control circuit 20 are connected to the output interface 86.

The turbine speed Nt indicated by a signal transmitted to the ECU 8 agrees with the primary pulley rotational speed (input shaft rotational speed) Nin, when the vehicle moves forward, that is, when the forward clutch C1 of the forward/reverse switching unit 3 is applied. The secondary pulley rotational speed (output shaft rotational speed) Nout indicated by a signal transmitted to the ECU 8 corresponds to a vehicle speed V. The accelerator pedal operation amount Acc indicates the amount of power required by the driver.

The shift lever 9 is operated to a position selected from Park position "P", Reverse position "R", Neutral position "N", Drive position "D", and Manual position "M". Park position "P" is selected when the vehicle is parked. Reverse position "R" is selected when the vehicle backs up. Neutral position "N" is selected when power transmission is interrupted. Drive position "D" is selected when the vehicle moves forward. Manual position "M" is selected when the speed ratio γ of the belt continuously variable transmission 4 is adjusted through a manual operation when the vehicle moves forward in a so-called manual mode. Manual position "M" includes a downshift position and an upshift position that are used to adjust the speed ratio γ or multiple range positions with which the shift range is selected from among multiple shift ranges that differ in shifting upper limit (limit at which the speed ratio γ is lower). The lever position sensor 110 is provided with multiple ON-OFF switches that determine that the shift lever 9 is operated to Park position "P", Reverse position "R", Neutral position "N", Drive position "D", Manual position "M", the upshift position, the downshift position, or the range position.

Based on the signals output from the various sensors, the ECU 8 executes various controls such as the output control over the engine 1, the control for regulating the hydraulic pressure that is supplied to the hydraulic actuator 41c of the primary pulley 41 of the belt continuously variable transmission 4 (shift hydraulic pressure), the control for regulating the hydraulic pressure that is supplied to the hydraulic actuator 42c of the secondary pulley 42 (belt holding hydraulic pressure) of the belt continuously variable transmission 4, the control for forming the line pressure PL, the control for forming the secondary pressure PSEC, the control for applying/releasing the friction application elements (forward clutch C1, reverse brake B1), and the control for applying/releasing the lockup clutch 24.

Next, portions which are related to the line pressure control unit 20c, the lockup clutch control unit 20d, the garage control unit 20e and the secondary pressure control unit 20f in the hydraulic pressure control circuit 20 will be described with reference to FIG. 3. The hydraulic pressure control circuit shown in HG 3 is a part of the entire hydraulic pressure control circuit 20.

Figure 3:
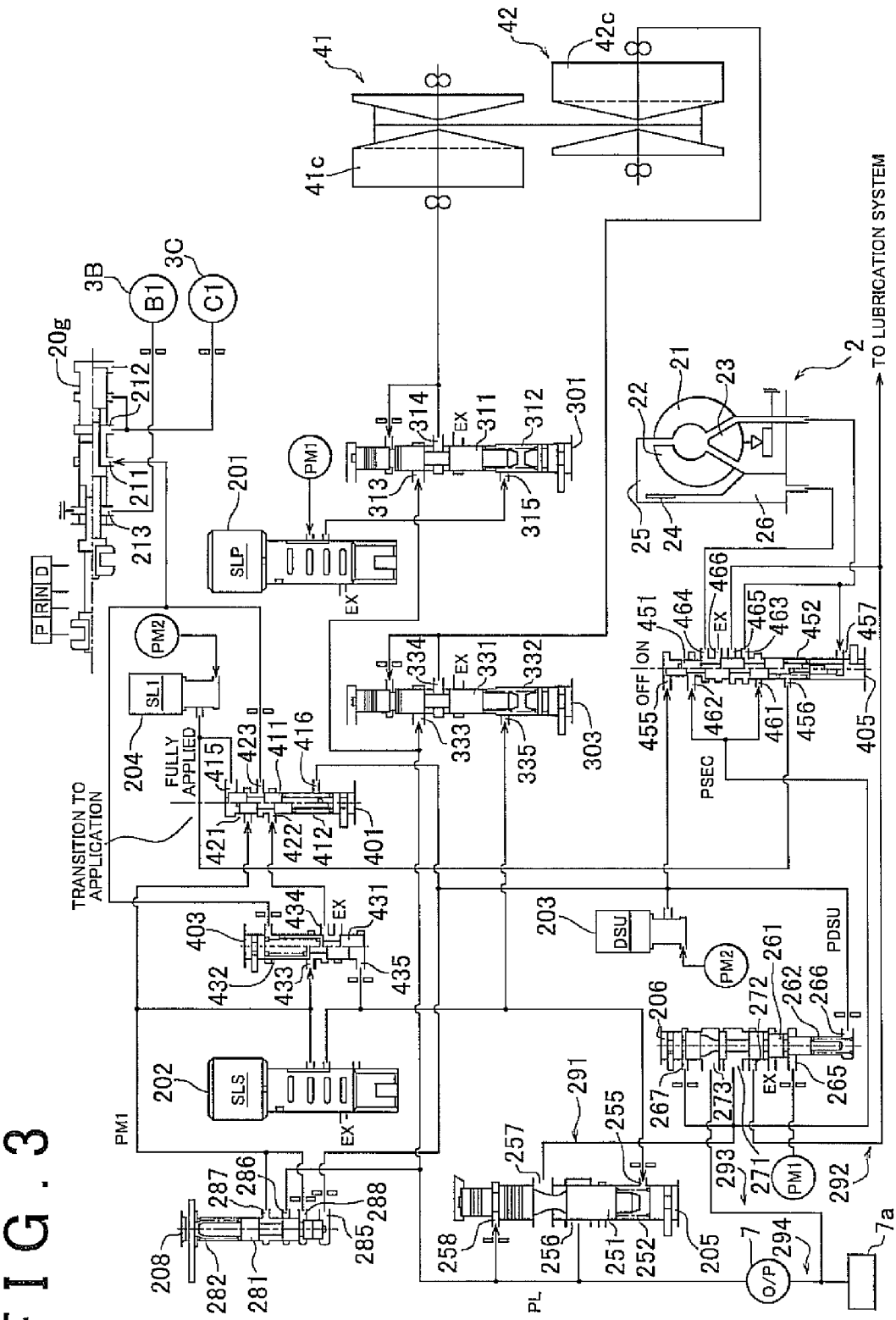
FIG. 3 is a circuit configuration diagram showing a hydraulic pressure control apparatus for the vehicle in FIG. 1.

The hydraulic pressure control circuit shown in FIG. 3 includes the oil pump 7, the manual valve 20g, the linear solenoid (SLP) 201, the linear solenoid (SLS) 202, the duty solenoid (DSU) 203, the ON-OFF solenoid (SL1) 204, a primary regulator valve 205, a secondary regulator valve 206, a first modulator valve 208, a shift hydraulic pressure control valve 301, a belt holding hydraulic pressure control valve 303, a clutch apply control valve 401, a clutch pressure control valve 403, and a lockup control valve 405.

The primary regulator valve 205 regulates the hydraulic pressure generated by the oil pump 7 (discharge pressure) to form the line pressure PL. The primary regulator valve 205 includes a spool 251 that is movable in the axial direction. In the primary regulator valve 205, a spring 252 is provided, in a compressed state, on the side of one end (lower end in FIG. 3) of the spool 251, and a control hydraulic pressure port 255 is formed on the side of the one end of the spool 251. A feedback port 258 is formed at an end portion of the primary regulator valve 205, which is on the opposite side of the spool 251 from the spring 252. In addition, an input port 256 to which the hydraulic fluid delivered from the oil pump 7 is supplied and an output port 257 which is connected to the secondary regulator valve 206 are formed in the primary regulator valve 205.

The linear solenoid (SLS) 202 is connected to the control hydraulic pressure port 255, and the control hydraulic pressure that is output from the linear solenoid (SLS) 202 is applied to the control hydraulic pressure port 255. The primary regulator valve 205 operates using the control hydraulic pressure from the linear solenoid (SLS) 202 as the pilot pressure to form the line pressure PL. The line pressure PL formed by the primary regulator valve 205 is supplied to the first modulator valve 208, the shift hydraulic pressure control valve 301, and the belt holding hydraulic pressure control valve 303. When communication is provided between the input port 256 and the output port 257, the hydraulic fluid is discharged to a secondary oil passage 291. The hydraulic pressure in the secondary oil passage 291 (secondary pressure PSEC) is regulated by the secondary regulator valve 206. The secondary regulator valve 206 will be described later in detail.

The first modulator valve 208 is a regulator valve that regulates the line pressure PL formed by the primary regulator valve 205 to a hydraulic pressure that is lower than the line pressure PL (first modulator hydraulic pressure PM1). The first modulator valve 208 includes a spool 281 that is movable in the axial direction. In the first modulator valve 208, a spring 282 is provided, in a compressed state, on the side of one end (upper end in FIG. 3) of the spool 281, and a control hydraulic pressure port 285 is formed at an end portion of the first modulator valve 208, which is on the opposite side of the spool 281 from the spring 282. An input port 286 to which the line pressure PL that is formed by the primary regulator valve 205 is supplied, an output port 287 from which the first modulator hydraulic pressure PM1 is output, and a feedback port 288 are formed in the first modulator valve 208.

The duty solenoid (DSU) 203 is connected to the control hydraulic pressure port 285, and the control hydraulic pressure that is output from the duty solenoid (DSU) 203 is applied to the control hydraulic pressure port 285. The first modulator valve 208 operates using the control hydraulic pressure from the duty solenoid (DSU) 203 as the pilot pressure to form the first modulator hydraulic pressure PM1. In this case, the first modulator hydraulic pressure PM1 is formed in such a manner that the first modulator hydraulic pressure PM1 is decreased as the control hydraulic pressure from the duty solenoid (DSU) 203 is increased. The first modulator hydraulic pressure PM1 is supplied to the linear solenoid (SLP) 201, the linear solenoid (SLS) 202, the secondary regulator valve 206, and the clutch pressure control valve 403, and supplied to the manual valve 20g via the clutch apply control valve 401.

The first modulator hydraulic pressure PM1 is supplied to a second modulator valve (not shown). The second modulator valve is a regulator valve that regulates the first modulator hydraulic pressure PM1 supplied from the first modulator valve 208 to a hydraulic pressure that is lower than the first modulator hydraulic pressure PM1 (second modulator hydraulic pressure PM2). The second modulator hydraulic pressure PM2 that is formed by the second modulator valve is supplied to the duty solenoid (DSU) 203 and the ON-OFF solenoid (SL1) 204.

The linear solenoid (SLP) 201 and the linear solenoid (SLS) 202 are normally-open linear solenoid valves. The linear solenoid (SLP) 201 and the linear solenoid (SLS) 202 each output a control hydraulic pressure (output hydraulic pressure) based on a current value which is determined based on a duty signal (duty value) transmitted from the ECU 8. The control hydraulic pressure that is output from the linear solenoid (SLP) 201 is supplied to the shift hydraulic pressure control valve 301. The control hydraulic pressure that is output from the linear solenoid (SLS) 202 is supplied to the primary regulator valve 205, the belt holding hydraulic pressure control valve 303, and the clutch pressure control valve 403. Normally-closed solenoid valves may be used as the linear solenoid (SLP) 201 and the linear solenoid (SLS) 202.

The duty solenoid (DSU) 203 is a normally-closed solenoid valve. The duty solenoid (DSU) 203 outputs a control hydraulic pressure (output hydraulic pressure) based on a current value that is determined based on a duty signal (duty value) transmitted from the ECU 8. The control hydraulic pressure output from the duty solenoid (DSU) 203 is supplied to the lockup control valve 405, the secondary regulator valve 206, the first modulator valve 208, and the clutch apply control valve 401. A normally-open solenoid valve may be used as the duty solenoid (DSU) 203.

The ON-OFF solenoid (SL1) 204 is a normally-closed solenoid valve. The ON-OFF solenoid (SL1) 204 is placed in a closed state in which the ON-OFF solenoid (SL1) 204 does not output the control hydraulic pressure when electric power is not supplied to the ON-OFF solenoid (SL1) 204. On the other hand, when electric power is supplied to the ON-OFF solenoid (SL1) 204, the ON-OFF solenoid (SL1) 204 is placed in an open state in which the ON-OFF solenoid (SL1) 204 outputs the control hydraulic pressure. The control hydraulic pressure that is output from the ON-OFF solenoid (SL1) 204 is supplied to the clutch apply control valve 401 and the lockup control valve 405. A normally-open solenoid valve may be used as the ON-OFF solenoid (SL1) 204.

As shown in FIG. 3, the shift hydraulic pressure control valve 301 is connected to the hydraulic actuator 41c of the primary pulley 41 of the belt continuously variable transmission 4.

The shift hydraulic pressure control valve 301 includes a spool 311 that is movable in the axial direction. In the shift hydraulic pressure control valve 301, a spring 312 is provided, in a compressed state, on the side of one end (lower end in FIG. 3) of the spool 311 (lower end in FIG. 3), and a control hydraulic pressure port 315 is formed on the side of the one end. The linear solenoid (SLP) 201 is connected to the control hydraulic pressure port 315, and the control hydraulic pressure that is output from the linear solenoid (SLP) 201 is applied to the control hydraulic pressure port 315.

An input port 313 to which the line pressure PL is supplied and an output port 314 that is connected to (communicated with) the hydraulic actuator 41c of the primary pulley 41 are formed in the shift hydraulic pressure control valve 301.

The shift hydraulic pressure control valve 301 regulates the line pressure PL using the control hydraulic pressure output from the linear solenoid (SLP) 201 as the pilot pressure, and supplies the regulated line pressure PL to the hydraulic actuator 41c of the primary pulley 41. Thus, the hydraulic pressure that is supplied to the hydraulic actuator 41c of the primary pulley 41 is controlled, and the speed ratio γ of the belt continuously variable transmission 4 is controlled.

More specifically, when a predetermined hydraulic pressure is supplied to the hydraulic actuator 41c of the primary pulley 41, if the control hydraulic pressure output from the linear solenoid (SLP) 201 increases, the spool 311 moves in the upward direction in FIG. 3. Thus, the hydraulic pressure that is supplied to the hydraulic actuator 41c of the primary pulley 41 increases, and the width of the V-shaped groove of the primary pulley 41 decreases. As a result, the speed ratio γ is decreased (upshifting is performed).

On the other hand, when the predetermined hydraulic pressure is supplied to the hydraulic actuator 41c of the primary pulley 41, if the control hydraulic pressure output from the linear solenoid (SLP) 201 is decreased, the spool 311 moves in the downward direction in FIG. 3. Thus, the hydraulic pressure that is supplied to the hydraulic actuator 41c of the primary pulley 41 is decreased, and the width of the V-shaped groove of the primary pulley 41 is increased. As a result, the speed ratio γ is increased (downshifting is performed).

In this case, the speed ratio γ of the belt continuously variable transmission 4 is changed based on the deviation of the actual input shaft rotational speed Nin from the target input shaft rotational speed that is set based on the vehicle state which is indicated by the actual vehicle speed B and the actual accelerator pedal operation amount Acc according to a shift map stored in the ROM 82 of the ECU 8 in advance, so that the actual input shaft rotational speed Nin agrees with the target input shaft rotational speed. The shift map indicates the shift condition. For example, the shift map indicates the relationship between the accelerator pedal operation amount Acc and the vehicle speed V, and the target input rotational speed for the belt continuously variable transmission 4, using the accelerator pedal operation amount Acc and the vehicle speed V as parameters.

As shown in FIG. 3, the belt holding hydraulic pressure control valve 303 is connected to the hydraulic actuator 42c of the secondary pulley 42 of the belt continuously variable transmission 4. The belt holding hydraulic pressure control valve 303 has the same structure as that of the above-described shift hydraulic pressure control valve 301. Accordingly, detailed description of the structure of the belt holding hydraulic pressure control valve 303 will not be provided below.

The linear solenoid (SLS) 202 is connected to a control hydraulic pressure port 335 of the belt holding hydraulic pressure control valve 303, and the control hydraulic pressure output from the linear solenoid (SLS) 202 is applied to the control hydraulic pressure port 335. The belt holding hydraulic pressure control valve 303 regulates the line pressure PL using the control hydraulic pressure output from the linear solenoid (SLS) 202 as the pilot pressure, and supplies the regulated line pressure PL to the hydraulic actuator 42c of the secondary pulley 42. Thus, the hydraulic pressure that is supplied to the hydraulic actuator 42c of the secondary pulley 42 is controlled, and the belt holding force for the belt continuously variable transmission 4 is controlled.

More specifically, when a predetermined hydraulic pressure is supplied to the hydraulic actuator 42c of the secondary pulley 42, if the control hydraulic pressure output from the linear solenoid (SLS) 202 increases, a spool 331 moves in the upward direction in FIG. 3. Thus, the hydraulic pressure that is supplied to the hydraulic actuator 42c of the secondary pulley 42 increases, and the belt holding hydraulic pressure increases.

On the other hand, when the predetermined hydraulic pressure is supplied to the hydraulic actuator 42c of the secondary pulley 42, if the control hydraulic pressure output from the linear solenoid (SLS) 202 decreases, the spool 331 moves in the downward direction in FIG. 3. Thus, the hydraulic pressure that is supplied to the hydraulic actuator 42c of the secondary pulley 42 decreases, and the belt holding force decreases.

In this case, the belt holding hydraulic pressure that is applied to the hydraulic actuator 42c of the secondary pulley 42 is regulated to achieve a required belt holding force that is set based on the vehicle state indicated by the actual speed ratio Y and the actual accelerator pedal operation amount Acc according to the belt holding force map stored in the ROM 82 of the ECU 8 in advance. The belt holding force for the belt continuously variable transmission 4 is changed based on the belt holding hydraulic pressure. The belt holding force map indicates the relationship between the accelerator pedal operation amount Acc and the speed ratio γ, and the required belt holding force, using the accelerator pedal operation amount Acc and the speed ratio γ as parameters. The relationship is empirically obtained in advance so that slippage of the belt does not occur.

As shown in FIG. 3, the manual valve 20g is connected to a hydraulic servo 3C of the forward clutch C1 and a hydraulic servo 3B of the reverse brake B1 of the forward/reverse switching unit 3.

The manual valve 20g is a selector valve that switches the manner for supplying the hydraulic pressure to the hydraulic servo 3C of the forward clutch C1 and the hydraulic servo 3B of the reverse brake B 1 of the forward/reverse switching unit 3 in response to an operation of the shift lever 9. The manual valve 20g switches the manner for supplying the hydraulic pressure based on the shift position of the shift lever 9, for example, Park position "P", Reverse position "R", Neutral position "N", or Drive position "D".

When the manual valve 20g is placed in the state that corresponds to Park position "P" or Neutral position "N", the hydraulic pressure is supplied to neither the hydraulic servo 3C of the forward clutch C1 nor the hydraulic servo 3B of the reverse brake B1. The hydraulic pressure in the hydraulic servo 3C of the forward clutch C1 and the hydraulic pressure in the hydraulic servo 3B of the reverse brake B 1 are drained via the manual valve 20g. Thus, the forward clutch C1 and the reverse brake B1 are both released.

When the manual valve 20g is placed in the state that corresponds to Reverse position "R" at which the vehicle backs up, communication is provided between the input port 211 and the output port 213, and the hydraulic pressure is supplied to the hydraulic servo 3B of the reverse brake B1. The hydraulic pressure in the hydraulic servo 3C of the forward clutch C1 is drained via the manual valve 20g. Thus, the reverse brake B1 is applied, and the forward clutch C 1 is released.

When the manual valve 20 is placed in the state that corresponds to Drive position "D" at which the vehicle moves forward, communication is provided between the input port 211 and the output port 212, and the hydraulic pressure is supplied to the hydraulic servo 3C of the forward clutch C1. The hydraulic pressure in the hydraulic servo 3B of the reverse brake B1 is drained via the manual valve 20g. Thus, the forward clutch C1 is applied, and the reverse brake B1 is released.

As shown in FIG. 3, the clutch apply control valve 401, which is a valve for switching the hydraulic pressure that is supplied to a friction application element, is connected to the manual valve 20g.

The clutch apply control valve 401 is a selector valve that switches the hydraulic pressure, which is supplied to the friction application element (forward clutch C1, reverse brake B1) of the forward/reverse switching unit 3, between the hydraulic pressure that corresponds to the state in which the friction application element is in the transition to application (application transition state) and the hydraulic pressure that corresponds to the state in which the friction application element is fully applied (fully applied state). For example, if the shift lever 9 is operated from a non-drive position, for example, Park position "P" or Neutral position "N", to a drive position, for example, Drive position "D", for example, when the vehicle is started, the hydraulic pressure, which is supplied to the hydraulic servo 3C of the forward clutch C1 via the manual valve 20g, is switched, by the clutch apply control valve 401, between the application transition hydraulic pressure that corresponds to the application transition state and the application maintaining hydraulic pressure that corresponds to the fully applied state. Similarly, when the shift lever 9 is operated to Reverse position "R", the hydraulic pressure, which is supplied to the hydraulic servo 3B of the reverse brake B 1 via the manual valve 20g, is switched, by the clutch apply control valve 401, between the application transition hydraulic pressure that corresponds to the state of transition to application and the application maintaining hydraulic pressure that corresponds to the fully applied state. The case where the hydraulic pressure that is supplied to the forward clutch C1 is switched by the clutch apply control valve 401 between the application transition hydraulic pressure and the application maintaining hydraulic pressure will be described below, but the case where the hydraulic pressure that is supplied to the reverse brake B1 is switched between the application transition hydraulic pressure and the application maintaining hydraulic pressure will basically not be described below.

The clutch apply control valve 401 is configured in such a manner that the clutch apply control valve 401 is placed in the application transition state indicated in the left half portion of the clutch apply control valve 401 in FIG. 3 when the clutch C1 is in the transition to application, and the clutch apply control valve 401 is placed in the application state indicated in the right half portion of the clutch apply control valve 401 in FIG. 3 when the forward clutch C1 is applied (fully applied).

More specifically, the clutch apply control valve 401 includes a spool 411 that is movable in the axial direction. In the clutch apply control valve 401, a spring 412 is provided, in a compressed state, on the side of one end (lower end in FIG. 3) of the spool 411, and a control hydraulic pressure port 415 is formed at an end portion on the opposite side of the spool 411 from the spring 412. A backup port 416 is formed at an end portion on the side of the one end on which the spring 412 is provided. The ON-OFF solenoid (SL1) 204 is connected to the control hydraulic pressure port 415, and the control hydraulic pressure output from the ON-OFF solenoid (SL1) 204 is applied to the control hydraulic pressure port 415.

An input port 421, an input port 422 and an output port 423 are formed in the clutch apply control valve 401. The input port 421 is connected to the first modulator valve 208. The input port 422 is connected to (communicated with) an output port 434 of the clutch pressure control valve 403. The output port 423 is connected to (communicated with) the input port 211 of the manual valve 20g.

The state of the clutch apply control valve 401 is switched by the ON-OFF solenoid (SL1) 204. More specifically, when the ON-OFF solenoid (SL1) 204 is in the closed state, the clutch apply control valve 401 is placed in the application state in which the spring 412 is in a state that is achieved when the spring 412 is fitted to the ON-OFF solenoid (SL1) 204. In this state, communication is provided between the input port 421 and the output port 423. Due to the communication between the input port 421 and the output port 423, the first modulator hydraulic pressure PM1 that is formed by the first modulator valve 208 is supplied to the hydraulic servo 3C of the forward clutch C1.

When the ON-OFF solenoid (SL1) 204 is in the open state, if the control hydraulic pressure is input in the control hydraulic pressure port 415, the state of the clutch apply control valve 401 is switched to the application transition state in which the spring 412 is compressed. At this time, communication is provided between the input port 422 and the output port 423. Due to the communication between the input port 422 and the output port 423, the hydraulic pressure that is formed by the clutch pressure control valve 403 is supplied to the hydraulic servo 3C of the forward clutch C1.

As shown in FIG. 3, the clutch pressure control valve 403 is connected to the clutch apply control valve 401.

The clutch pressure control valve 403 is a regulator valve that regulates the application transition hydraulic pressure that is supplied to the forward clutch C1 using the control hydraulic pressure output from the linear solenoid (SLS) 202 as the pilot pressure.

The clutch pressure control valve 403 includes a spool 431 that is movable in the axial direction. In the clutch pressure control valve 403, a spring 432 is provided, in a compressed state, on the side of one end (upper end in FIG. 3) of the spool 431, and a control hydraulic pressure port 435 is formed at an end portion on the opposite side of the spool 431 from the spring 432. The linear solenoid (SLS) 202 is connected to the control hydraulic pressure port 435, and the control hydraulic pressure output from the linear solenoid (SLS) 202 is applied to the control hydraulic pressure port 435.

Formed in the clutch pressure control valve 403 are an input port 433 to which the first modulator hydraulic pressure PM1 that is formed by the first modulator valve 208 is supplied, and the output port 434 that is connected to (communicated with) the input port 422 of the clutch apply control valve 401.

The hydraulic pressure output from the output port 434 of the clutch pressure control valve 403 is supplied to the hydraulic servo 3C of the forward clutch C1 via the manual valve 20g, when the clutch apply control valve 401 is placed in the application transition state. In other words, the clutch pressure control valve 403 controls the application transition hydraulic pressure that is supplied to the forward clutch C1 when the forward clutch C1 is in the transition to application.

In this case, if the control hydraulic pressure output from the linear solenoid (SLS) 202 increases, the spool 431 moves in the upward direction in FIG. 3 against an elastic force of the spring 432. Thus, the hydraulic pressure output from the output port 434 increases, and the application transition hydraulic pressure that is supplied to the forward clutch C1 increases. On the other hand, if the control hydraulic pressure output from the linear solenoid (SLS) 202 decreases, the spool 431 is moved in the downward direction in FIG. 3 by an elastic force of the spring 432. Thus, the hydraulic pressure output from the output port 434 decreases, and the application transition hydraulic pressure that is supplied to the forward clutch C1 decreases.

As shown in FIG. 3, the lockup control valve 405 is connected to the application-side hydraulic chamber 25 and the release-side hydraulic chamber 26 of the lockup clutch 24.

The lockup control valve 405 controls the application/release state of the lockup clutch 24. More specifically, the lockup control valve 405 controls the lockup pressure difference (=hydraulic pressure in the application-side hydraulic chamber 25−hydraulic pressure in the release-side hydraulic chamber 26) to control the application/release state of the lockup clutch 24.

The lockup control valve 405 includes a spool 451 that is movable in the axial direction. In the lockup control valve 405, a spring 452 is provided, in a compressed state, on the side of one end (lower end in FIG. 3) of the spool 451, and a control hydraulic pressure port 455 is formed at an end portion on the opposite side of the spool 451 from the spring 452. A backup port 456 and a feedback port 457 are formed on the side of the one end on which the spring 452 is provided. The duty solenoid (DSU) 203 is connected to the control hydraulic pressure port 455, and the control hydraulic pressure output from the duty solenoid (DSU) 203 is applied to the control hydraulic pressure port 455. An input port 461, an input port 462, an output port 465, an input/output port 463, an input/output port 464, and a drain port 466 are formed in the lockup control valve 405.

The input ports 461 and 462 are connected to the above-described secondary oil passage 291. The secondary pressure PSEC that is formed by the secondary regulator valve 206, described later in detail, is supplied to the input ports 461 and 462. The input/output port 463 is connected to the application-side hydraulic chamber 25 of the lockup clutch 24. The input/output port 464 is connected to the release-side hydraulic chamber 26 of the lockup clutch 24. The output port 465 is connected to each element of a lubrication system via a first drain oil passage 292. The backup port 456 is connected to the ON-OFF solenoid (SL1) 204.

The lockup control valve 405 controls the application/release state of the lockup clutch 24 in the following manner.

When the control hydraulic pressure from the duty solenoid (DSU) 203 is introduced into the control hydraulic pressure port 455, the lockup control valve 405 is placed in the state (ON state) in which the spool 451 is moved downward against an elastic force of the spring 452 based on the control hydraulic pressure. In this case, as the control hydraulic pressure is increased, the spool 451 is moved downward by a larger amount. The right half portion of the lockup control valve 405 in FIG. 3 indicates the state in which the spool 451 is moved downward to the fullest extent. In the state indicated in the right half portion of the lockup control valve 405 in FIG. 3, communication is provided between the input port 461 and the input/output port 463, and between the input/output port 464 and the drain port 466. In this state, the lockup clutch 24 is fully applied.

When the lockup control valve 405 is in the ON state, the spool 451 slides in the up-down direction based on a balance between i) a resultant of the control hydraulic pressure from the duty solenoid (DSU) 203 introduced into the control hydraulic pressure port 455 and a force of the hydraulic pressure introduced into the input/output port 464 (hydraulic pressure in release-side hydraulic chamber 26), the force being applied to the spool 451, and ii) a resultant of a force of the hydraulic pressure introduced into the feedback port 457 (hydraulic pressure in the application-side hydraulic chamber 25), the force being applied to the spool 451, and an elastic force of the spring 452. The lockup clutch 24 is applied or released based on the lockup pressure difference. The lockup pressure difference is controlled by controlling the control hydraulic pressure that is output from the duty solenoid (DSU) 203. It is possible to continuously change the degree of application of the lockup clutch 24 based on the lockup pressure difference.

More specifically, as the control hydraulic pressure that is output from the duty solenoid (DSU) 203 is increased, the lockup pressure difference is increased and the degree of application of the lockup clutch 24 is increased. In this case, the hydraulic fluid from the secondary regulator valve 206 is supplied to the application-side hydraulic chamber 25 of the lockup clutch 24 via the input port 461 and the input/output port 463. The hydraulic fluid in the release-side hydraulic chamber 26 is discharged via the input/output port 464 and the drain port 466. When the lockup pressure difference is equal to or larger than a predetermined value, the lockup clutch 24 is fully applied.

On the other hand, as the control hydraulic pressure that is output from the duty solenoid (DSU) 203 is decreased, the lockup pressure difference is decreased and the degree of application of the lockup clutch 24 is decreased. When the lockup pressure difference is a negative value, the lockup clutch 24 is released. In this case, the hydraulic fluid from the secondary regulator valve 206 is supplied to the release-side hydraulic chamber 26 via the input port 462 and the input/output port 464. The hydraulic fluid in the application-side hydraulic chamber 25 is output via the input/output port 463 and the output port 465. The hydraulic fluid discharged from the output port 465 is supplied to each element of the lubrication system via the first drain oil passage 292.

When the supply of the control hydraulic pressure from the duty solenoid (DSU) 203 to the control hydraulic pressure port 455 is stopped, the lockup control valve 405 is placed in the state (OFF state) in which the spool 451 has moved upward by an elastic force of the spring 452 and maintained at the original position, as indicated in the left half portion of the lockup control valve 405 in FIG. 3. In the OFF state, communication is provided between the input port 462 and the input/output port 464 and between the input/output port 463 and the output port 465. In this state, the lockup clutch 24 is released.

When the above-described ON-OFF solenoid (SL1) 204 is in the open state, the control hydraulic pressure from the ON-OFF solenoid is introduced into the backup port 456. Therefore, the application/release state of the lockup clutch 24 is not controlled in the above-described manner, and the control for forcibly releasing the lockup clutch 24 is executed.

Next, the secondary regulator valve 206 that is provided downstream of the primary regulator valve 205 will be described.

The secondary regulator valve 206 is a regulator valve that regulates the hydraulic pressure in the oil passage downstream of the primary regulator valve 205, that is, the hydraulic pressure discharged into the secondary oil passage 291, to form the secondary pressure PSEC. In the first embodiment of the invention, the secondary pressure PSEC formed by the secondary regulator valve 206 is supplied to the input ports 461 and 462 of the lockup control valve 405.

The secondary regulator valve 206 includes a spool 261 that is movable in the axial direction. In the secondary regulator valve 206, a spring 262 is provided, in a compressed state, on the side of one end (lower end in FIG. 3) of the spool 261, and a first control hydraulic pressure port 265 and a second control hydraulic pressure port 266 are formed on the side of the one end. A feedback port 267 that is connected to (communicated with) the secondary oil passage 291 is formed at an end portion that is on the opposite side of the spool 261 from the spring 262.

Formed in the secondary regulator valve 206 are an input port 271 that is connected to (communicated with) the secondary oil passage 291, a first drain port 272 that is connected to (communicated with) the first drain oil passage 292, and a second drain port 273 that is connected to (communicated with) a second drain oil passage 293. The first drain oil passage 292 is connected to each element of the lubrication system. The second drain oil passage 293 is connected to an intake oil passage 294 formed between the oil pump 7 and a strainer 7a which is provided at an oil inlet to remove foreign matter.

The first modulator valve 208 is connected to the first control hydraulic pressure port 265, and the first modulator hydraulic pressure PM1 output from the first modulator valve 208 is applied to the first control hydraulic pressure port 265. The first modulator hydraulic pressure PM1 that is introduced into the first control hydraulic pressure port 265 is applied to the spool 261 in the same direction as the direction in which an elastic force of the spring 262 is applied to the spool 261. More specifically, the area of a portion of the spool 261, which receives the first modulator hydraulic pressure PM1 (hereinafter, referred to as "pressure-receiving area") differs between a portion of the spool 261, which receives the first modulator hydraulic pressure PM1 that is applied in the upward direction in FIG. 3, and a portion of the spool 261, which receives the first modulator hydraulic pressure PM1 that is applied in the downward direction in FIG. 3. The pressure-receiving area of the portion that receives the first modulator hydraulic pressure PM1 which is applied in the upward direction in FIG. 3 is set to be larger than the pressure-receiving area of the portion that receives the first modulator hydraulic pressure PM1 which is applied in the downward direction in FIG. 3. That is, the pressure-receiving area of the portion that receives the first modulator hydraulic pressure PM1, which is applied in the same direction as the direction in which the elastic force of the spring 262 is applied, is set to be larger than the pressure-receiving area of the portion that receives the first modulator hydraulic pressure PM1, which is applied in the direction opposite to the direction in which the elastic force of the spring 262 is applied.

The duty solenoid (DSU) 203 is connected to the second control hydraulic pressure port 266. The control hydraulic pressure PDSU output from the duty solenoid (DSU) 203 is applied to the second control hydraulic pressure port 266. The control hydraulic pressure PDSU from the duty solenoid (DSU) 203, which is introduced into the second control hydraulic pressure port 266, is applied to the spool 261 in the same direction as the direction in which the elastic force of the spring 262 is applied to the spool 261. Therefore, the control hydraulic pressure PDSU from the duty solenoid (DSU) 203 is applied to the spool 261 in the same direction as the direction in which the first modulator hydraulic pressure PM1 is applied to the spool 261.

The hydraulic pressure introduced from the secondary oil passage 291 to the feedback port 267 (secondary pressure PSEC) is applied to the spool 261 in the direction opposite to the direction in which the elastic force of the spring 262 is applied to the spool 261. Therefore, the first modulator hydraulic pressure PM1 and the control hydraulic pressure PDSU from the duty solenoid (DSU) 203 act on the spool 261 in such a manner that the first modulator pressure PM1 and the control hydraulic pressure PDSU oppose the hydraulic pressure that is introduced into the feedback port 267.

The secondary regulator valve 206 operates using the first modulator hydraulic pressure PM1 and the control hydraulic pressure PDSU from the duty solenoid (DSU) 203 as the pilot pressures to form the secondary pressure PSEC. At this time, the spool 261 slides in the up-down direction based on a balance between i) a resultant of a force of the first modulator hydraulic pressure PM1 that is introduced into the first control hydraulic pressure port 265, the force being applied to the spool 261, a force of the control hydraulic pressure PDSU from the duty solenoid (DSU) 203 that is introduced into the second control hydraulic pressure port 266, the force being applied to the spool 261, and an elastic force of the spring 262, and ii) a force of the hydraulic pressure introduced into the feedback port 267, the force being applied to the spool 261.

When communication is provided between the input port 271 and the first drain port 272 due to the movement of the spool 261, the hydraulic fluid in the secondary oil passage 291 is discharged into the first drain oil passage 292 and then supplied to each element of the lubrication system. When communication is provided between the input port 271 and the second drain port 273 due to the movement of the spool 261, the hydraulic fluid in the secondary oil passage 291 is discharged to the second drain oil passage 293 and then returned to the intake oil passage 294 located upstream of the oil pump 7.

In the first embodiment of the invention, the secondary regulator valve 206 is configured in such a manner that the first modulator hydraulic pressure PM1 and the control hydraulic pressure PDSU from the duty solenoid (DSU) 203 are introduced into the secondary regulator valve 206 as the pilot pressures. If one of the pilot pressures changes, the change in the one of the pilot pressures is absorbed by the other pilot pressure. More specifically, when one of the pilot pressures changes, the other pilot pressure changes in such a manner that the change in the resultant of the pilot pressures applied to the spool 261 is minimized. According to the first embodiment of the invention, even if one of the pilot pressures changes, the influence of the change is minimized. That is, even if one of the first modulator hydraulic pressure PM1 and the control hydraulic pressure PDSU from the duty solenoid (DSU) 203 changes, a change in the secondary pressure PSEC that is formed by the secondary regulator valve 206 is minimized. The detailed description will be provided below.

As described above, the first modulator hydraulic pressure PM1 is formed by the first modulator valve 208, more specifically, the first modulator hydraulic pressure PM1 is formed in such a manner that the first modulator hydraulic pressure PM1 decreases with an increase in the control hydraulic pressure PDSU from the duty solenoid (DSU) 203 for controlling the application pressure for the lockup clutch. The first modulator hydraulic pressure PM1 is formed in this manner in order to minimize the application maintaining hydraulic pressure that is supplied to the hydraulic servo 3C of the forward clutch C1 (hereinafter, referred to as "clutch pressure PC" where appropriate) when the forward clutch C1 is fully applied in the case where the vehicle moves forward, that is, in the case where the shift lever 9 is in Drive position "D". In this way, the fuel efficiency is enhanced.

More specifically, as the control hydraulic pressure PDSU from the duty solenoid (DSU) 203 increases, the lockup pressure difference in the lockup clutch 24 increases and the degree of application of the lockup clutch 24 increases. At this time, the ON-OFF solenoid (SL1) 204 is placed in the closed state, and the clutch apply control valve 401 is maintained in the application state. Therefore, the first modulator hydraulic pressure PM1 is supplied to the hydraulic servo 3C of the forward clutch C1. As the control hydraulic pressure PDSU from the duty solenoid (DSU) 203 increases, the first modulator hydraulic pressure PM1 is decreased. Therefore, as the degree of application of the lockup clutch 24 is increased, the clutch pressure PC that is supplied to the hydraulic servo 3C of the forward clutch C1 is decreased. When the lockup clutch 24 is fully applied, the clutch pressure PC is set to the lowest pressure. Decreasing the clutch pressure PC in this manner makes it possible to reduce loss torque at a seal ring of the forward clutch C1 and to enhance the fuel efficiency.

When the secondary regulator valve 206 is configured in such a manner that only the first modulator hydraulic pressure PM1 is introduced into the secondary regulator valve 206 as the pilot pressure, if the first modulator hydraulic pressure PM1 is set to a low pressure in order to decrease the clutch pressure PC, the pilot pressure that opposes the hydraulic pressure that is introduced into the feedback port 267 is decreased. Therefore, the secondary pressure PSEC that is formed by the secondary regulator valve 206 is decreased. As a result, the degree of application of the lockup clutch 24 may be insufficient and the lockup clutch 24 may be erroneously released.

In the first embodiment of the invention, the first modulator hydraulic pressure PM1 and the control hydraulic pressure PDSU from the duty solenoid (DSU) 203 are introduced into the secondary regulator valve 206 as the pilot pressures. Therefore, even if the first modulator hydraulic pressure PM1 is set to a low hydraulic pressure in order to decrease the clutch pressure PC, a decrease in the pilot pressures that oppose the hydraulic pressure introduced into the feedback port 267 is minimized. Between the first modulator hydraulic pressure PM1 that is introduced into the first control hydraulic pressure port 265 and the control hydraulic pressure PDSU from the duty solenoid (DSU) that is introduced into the second control hydraulic pressure port 266, there is a correlation such that as one of the first modulator hydraulic pressure PM1 and the control hydraulic pressure PDSU is increased, the other is decreased. Therefore, a decrease in the first modulator hydraulic pressure PM1 is compensated for by an increase in the control hydraulic pressure PDSU from the duty solenoid (DSU) 203. Thus, it is possible to minimize a decrease in the resultant of the two pilot pressures that oppose the hydraulic pressure introduced into the feedback port 267 due to a decrease in the first modulator hydraulic pressure PM1. Thus, it is possible to minimize a decrease in the secondary pressure PSEC, and to prevent the lockup clutch 24 from being erroneously released.

Conversely, when the first modulator hydraulic pressure PM1 is increased, an increase in the first modulator hydraulic pressure PM1 is offset by a decrease in the control hydraulic pressure PDSU from the duty solenoid (DSU) 203. Therefore, it is possible to minimize an increase in the secondary pressure PSEC, and to enhance the durability of the torque converter 2. Similarly, when the control hydraulic pressure PDSU from the duty solenoid (DSU) 203 changes, an increase or a decrease in the control hydraulic pressure PDSU is offset by a decrease or an increase in the first modulator hydraulic pressure PM1. Therefore, it is possible to minimize a change in the secondary pressure PSEC. That is, even if one of the pilot pressures introduced into the secondary regulator valve 206 changes, the change is absorbed by the other pilot pressure. Thus, even if the pilot pressure that is supplied to the secondary regulator valve 206 changes, it is possible to minimize the influence of the change and to minimize a change in the secondary pressure PSEC.

In the first embodiment of the invention, because the first modulator hydraulic pressure PM1 is used as the original pressure for the linear solenoid (SLP) 201 and the linear solenoid (SLS) 202, it is possible to decrease the flow amount of hydraulic pressure consumed by the linear solenoid (SLP) 201 and the linear solenoid (SL2) 202. Thus, it is possible to enhance the flow amount balance of the oil pump 7, which contributes to downsizing of the oil pump 7.

As the flow amount of hydraulic pressure consumed by the linear solenoid (SLP) 201 and the linear solenoid (SLS) 202 is decreased, the flow amount of hydraulic fluid that is discharged to the secondary oil passage 291 increases. Therefore, it is possible to improve the cracking performance of the secondary regulator valve 206. Accordingly, the flow amount of hydraulic fluid that is supplied to each element of the lubrication system via the drain oil passage 292 is increased. Because the hydraulic fluid is returned to the intake oil passage 294 located upstream of the oil pump 7 via the second drain oil passage 293, it is possible to decrease intake resistance due to passage of the hydraulic fluid through the strainer 7a, and to suppress development of cavitation.

Hereafter, a second embodiment of the invention will be described. In the first embodiment of the invention described above, the first modulator hydraulic pressure PM1 and the control hydraulic pressure PDSU from the duty solenoid (DSU) 203 are used as the pilot pressures that are supplied to the secondary regulator valve 206. In the second embodiment of the invention, the first modulator hydraulic pressure PM1 and the hydraulic pressure that is supplied to the hydraulic servo 3B of the reverse brake B1 (hereafter, referred to as "brake pressure PB") are used as the pilot pressures that are supplied to a secondary regulator valve 606.

Figure 4:
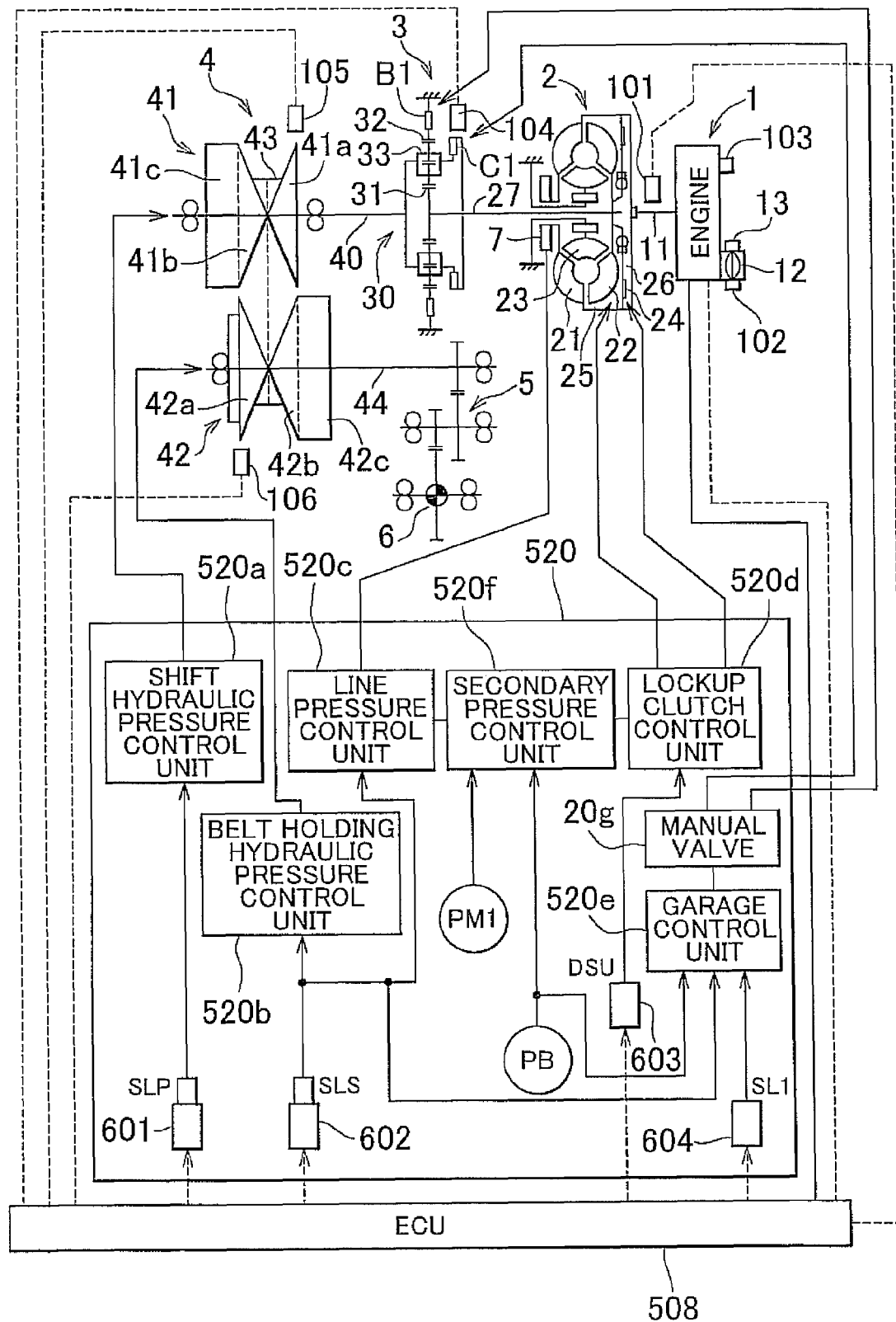
FIG. 4 is a view schematically showing the structure of a vehicle according to a second embodiment of the invention.

FIG. 4 is a view schematically showing a vehicle according to the second embodiment of the invention.

The vehicle shown in FIG. 4 is the same in structure as the vehicle shown in FIG. 1 except that an ECU 508 and a hydraulic pressure control circuit 520 are different in configuration from the ECU 8 and the hydraulic pressure control circuit 20. Therefore, the same portions will be denoted by the same reference numerals and detailed description thereof will not be provided below.

As shown in FIG. 4, the hydraulic pressure control circuit 520 includes a shift hydraulic pressure control unit 520a that controls the hydraulic pressure that is supplied to the hydraulic actuator 41c of the primary pulley 41 of the belt continuously variable transmission 4, a belt holding hydraulic pressure control unit 520b that controls the hydraulic pressure that is supplied to the hydraulic actuator 42c of the secondary pulley 42, a line pressure control unit 520c that controls the line pressure PL used as the original pressure for the hydraulic pressure which is supplied to each element, a lockup clutch control unit 520d that controls the application/release state of the lockup clutch 24, a garage control unit 520e that controls the application/release state of the friction application element (forward clutch C1, reverse brake B1), a secondary pressure control unit 520f that controls the secondary pressure PSEC, and the manual valve 20g. Control signals from the ECU 508 are transmitted to a linear solenoid (SLP) 601, a linear solenoid (SLS) 602, a duty solenoid (DSU) 603 for controlling the application pressure for the lockup clutch, and an ON-OFF solenoid (SL1) 604.

As shown in HG 5, the ECU 508 includes a CPU 581, a ROM 582, a RAM 583, a backup RAM 584, etc. The ECU 508 has substantially the same configuration as that of the ECU 8 shown in FIG. 2. The CPU 581, the ROM 582, the RAM 583 and the backup RAM 584 are connected to each other via a bi-directional bus 587, and connected to an input interface 585 and an output interface 586.

The various sensors 101 to 110 are connected to the input interface 586 as in the case of the input interface 85 of the ECU 8 shown in FIG. 2. The throttle motor 13, the fuel injection device 14, the ignition device 15 and the hydraulic pressure control circuit 520 are connected to the output interface 586 as in the case of the output interface 86 of the ECU 8 shown in FIG. 2.

Based on the signals output from the above-described various sensors, etc., the ECU 508 executes various controls such as the output control over the engine 1, the control for regulating the hydraulic pressure that is supplied to the hydraulic actuator 41c of the primary pulley 41 of the belt continuously variable transmission 4 (shift hydraulic pressure), the control for regulating the hydraulic pressure that is supplied to the hydraulic actuator 42c of the secondary pulley 42 (belt holding hydraulic pressure) of the belt continuously variable transmission 4, the control for forming the line pressure PL, the control for forming the secondary pressure PSEC, the control for applying/releasing the friction application elements (forward clutch C1, reverse brake B1), and the control for applying/releasing the lockup clutch 24.

Next, the portions which are related to the line pressure control unit 520c, the lockup clutch control unit 520d, the garage control unit 520e, and the secondary pressure control unit 520f in the hydraulic pressure control circuit 520 will be described with reference to FIG. 6. The hydraulic pressure control circuit shown in HG 6 is a part of the entire hydraulic pressure control circuit 520.

The hydraulic pressure control circuit shown in FIG. 6 includes the oil pump 7, the manual valve 20g, the linear solenoid (SLP) 601, the linear solenoid (SLS) 602, the duty solenoid (DSU) 603, the ON-OFF solenoid (SL1) 604, a primary regulator valve 605, the secondary regulator valve 606, a first modulator valve 608, a shift hydraulic pressure control valve 701, a belt holding hydraulic pressure control valve 703, a clutch apply control valve 801, a clutch pressure control valve 803, and a lockup control valve 805.

The oil pump 7, the manual valve 20g, the linear solenoid (SLP) 601, the linear solenoid (SLS) 602, the duty solenoid (DSU) 603, the ON-OFF solenoid (SL1) 604, the primary regulator valve 605, the shift hydraulic pressure control valve 701, the belt holding hydraulic pressure control valve 703, the clutch apply control valve 801, the clutch pressure control valve 803, and the lockup control valve 805 in the second embodiment of the invention have the same structures and performs the same functions as those of the oil pump 7, the manual valve 20g, the linear solenoid (SLP) 201, the linear solenoid (SLS) 202, the duty solenoid (DSU) 203, the ON-OFF solenoid (SL1) 204, the primary regulator valve 205, the shift hydraulic pressure control valve 301, the belt holding hydraulic pressure control valve 303, the clutch apply control valve 401, the clutch pressure control valve 403, and the lockup control valve 405, respectively (see FIG. 3). The portions that are the same as those in the first embodiment of the invention will not be described below.

The secondary regulator valve 606 and the first modulator valve 608 in the second embodiment of the invention are slightly different in the structure from the secondary regulator valve 206 and the first modulator valve 208 in the first embodiment of the invention, respectively.

The first modulator valve 608 is a regulator valve that regulates the line pressure PL formed by the primary regulator valve 605 to a hydraulic pressure that is lower than the line pressure PL (first modulator hydraulic pressure PM1). The first modulator valve 608 includes a spool 681 that is movable in the axial direction. In the first modulator valve 608, a spring 682 is provided, in a compressed state, on the side of one end (upper end in HG 6) of the spool 681, and a control hydraulic pressure port 685 is formed on the side of the one end. An input port 686 to which the line pressure PL formed by the primary regulator valve 605 is supplied, an output port 687 from which the first modulator hydraulic pressure PM1 is output, and a feedback port 688 are formed in the first modulator valve 608.

The output port 213 of the manual valve 20g and the hydraulic servo 3B of the reverse brake B1 are connected to the control hydraulic pressure port 685 via a brake oil passage 695. The brake pressure PB that is supplied to the hydraulic servo 3B of the reverse brake B1 is applied to the control hydraulic pressure port 685. The first modulator valve 608 operates using the brake pressure PB as the pilot pressure to form the first modulator hydraulic pressure PM1. The first modulator hydraulic pressure PM1 is formed based on the brake pressure PB. As the brake pressure PB increases, the first modulator hydraulic pressure PM1 is increased.

More specific description will be provided below. In the cases other than the case where the vehicle backs up, that is, the case where the shift lever 9 is in Reverse position "R", because the hydraulic pressure in the hydraulic servo 3B of the reverse brake B1 is drained, the brake pressure PB is zero and therefore the brake pressure PB is not introduced into the control hydraulic pressure port 685. In this case, the first modulator hydraulic pressure PM1 is maintained at the lowest pressure.

On the other hand, when the vehicle back up, that is, when the shift lever 9 is in Reverse position "R", communication is provided between the input port 211 and the output port 213 of the manual valve 20g. Therefore, the hydraulic pressure that corresponds to the application transition state or the fully applied state of the reverse brake B1 is supplied to the hydraulic servo 3B of the reverse brake B1. Accordingly, the hydraulic pressure that corresponds to the application transition state or the fully applied state is used as the brake pressure PB. When the reverse brake B1 is fully applied, the brake pressure PB exhibits the maximum value, which is equal to the first modulator hydraulic pressure PM1 that is formed by the first modulator valve 608.

The first modulator hydraulic pressure PM1 is supplied to the linear solenoid (SLP) 601, the linear solenoid (SLS) 602, the secondary regulator valve 606, and the clutch pressure control valve 803, and supplied to the manual valve 20g via the clutch apply control valve 801. The first modulator hydraulic pressure PM1 is supplied to a second modulator valve (not shown). The second modulator valve is a regulator valve that regulates the first modulator hydraulic pressure PM1 supplied from the first modulator valve 608 to a hydraulic pressure that is lower than the first modulator hydraulic pressure PM1 (second modulator hydraulic pressure PM2). The second modulator hydraulic pressure PM2 formed by the second modulator valve is supplied to the duty solenoid (DSU) 603 and the ON-OFF solenoid (SL1) 604.

The secondary regulator valve 606 is a regulator valve that regulates the hydraulic pressure in the oil passage downstream of the primary regulator valve 605, that is, the hydraulic pressure discharged to a secondary oil passage 691, to form the secondary pressure PSEC. In the second embodiment of the invention, the secondary pressure PSEC formed by the secondary regulator valve 606 is supplied to the input ports 861 and 862 of the lockup control valve 805.

The secondary regulator valve 606 includes a spool 661 that is movable in the axial direction. In the secondary regulator valve 606, a spring 662 is provided, in a compressed state, on the side of one end (lower end in FIG. 6) of the spool 661, and a first control hydraulic pressure port 665 is formed on the side of the one end. A second control hydraulic pressure port 666 and a feedback port 667 that is connected to (communicated with) the secondary oil passage 691 are formed at an end portion of the secondary regulator valve 606, which is on the opposite side of the spool 661 from the spring 662.

Formed in the secondary regulator valve 606 are an input port 671 that is connected to (communicated with) the secondary oil passage 691, a first drain port 672 that is connected to (communicated with) a first drain oil passage 692, and a second drain port 673 that is connected to (communicated with) a second drain oil passage 693. The first drain oil passage 692 is connected to each element of the lubrication system. The second drain oil passage 693 is connected to an intake oil passage 694 that is located between the oil pump 7 and the strainer 7a.

The first modulator valve 608 is connected to the first control hydraulic pressure port 665. The first modulator hydraulic pressure PM1 output from the first modulator valve 608 is applied to the first control hydraulic pressure port 665. The first modulator hydraulic pressure PM1 introduced into the first control hydraulic pressure port 665 is applied to the spool 661 in the same direction as the direction in which an elastic force of the spring 662 is applied to the spool 661.

The second control hydraulic pressure port 666 is connected to the brake oil passage 695, and the brake pressure PB is applied to the second control hydraulic pressure port 666. The brake pressure PB introduced into the second control hydraulic pressure port 666 is applied to the spool 661 in the direction opposite to the direction in which an elastic force of the spring 662 is applied to the spool 661. More specifically, the area of a portion of the spool 661, which receives the brake pressure PB, (hereinafter, referred to as "pressure-receiving area") differs between a portion of the spool 661, which receives the brake pressure PB that is applied in the upward direction in FIG. 6 and a portion of the spool 661, which receives the brake pressure PB that is applied in the downward direction in FIG. 6. The pressure-receiving area of the portion that receives the brake pressure PB which is applied in the downward direction in FIG. 6 is set to be larger than the pressure-receiving area of the portion that receives the brake pressure PB which is applied in the upward direction in FIG. 6. That is, the pressure-receiving area of the portion that receives the brake pressure PB, which is applied in the direction opposite to the direction in which the elastic force of the spring 662 is applied, is set to be larger than the pressure-receiving area of the portion that receives the brake pressure PB, which is applied in the same direction as the direction in which the elastic force of the spring 662 is applied. Therefore, the brake pressure PB is applied to the spool 661 in the direction opposite to the direction in which the first modulator hydraulic pressure PM1 is applied to the spool 661.

The hydraulic pressure that is introduced from the secondary oil passage 691 to the feedback port 667 (secondary pressure PSEC) is applied to the spool 661 in the direction opposite to the direction in which an elastic force of the spring 662 is applied to the spool 661. Therefore, the first modulator hydraulic pressure PM1, the brake pressure PB and the hydraulic pressure introduced into the feedback port 667 are applied to the spool 661 in such a manner that the first modulator hydraulic pressure PM1 opposes the brake pressure PB and the hydraulic pressure introduced into the feedback port 667.

The secondary regulator valve 606 operates using the first modulator hydraulic pressure PM1 and the brake pressure PB as the pilot pressures to form the secondary pressure PSEC. At this time, the spool 661 slides in the up-down direction based on a balance between i) a resultant of a force of the first modulator hydraulic pressure that is introduced into the first control hydraulic pressure port 665, the force being applied to the spool 661, and an elastic force of the spring 662, and ii) a resultant of a force of the brake pressure PB that is introduced into the second control hydraulic pressure port 666, the force being applied to the spool 661, and a force of the hydraulic pressure that is introduced into the feedback port 667, the force being applied to the spool 661.

When communication is provided between the input port 671 and the first drain port 672 due to the movement of the spool 661, the hydraulic fluid in the secondary oil passage 691 is discharged into the first drain oil passage 692 and then supplied to each element of the lubrication system. When communication is provided between the input port 671 and the second drain port 673 due to the movement of the spool 661, the hydraulic fluid in the secondary oil passage 691 is discharged into the second drain oil passage 693 and is returned to the intake oil passage 694 located upstream of the oil pump 7.

In the second embodiment of the invention, the secondary regulator valve 606 is configured in such a manner that the first modulator hydraulic pressure PM1 and the brake pressure PB are introduced into the secondary regulator valve 606 as the pilot pressures. When one of the pilot pressures changes, the change is absorbed by the other pilot pressure. In other words, when one of the pilot pressures changes, the other pilot pressure changes in such a manner that the change in the resultant of the pilot pressures that are applied to the spool 661 is minimized. According to the second embodiment of the invention, even if one of the pilot pressures changes, the influence of the change is minimized. More specifically, even if one of the first modulator hydraulic pressure PM1 and the brake pressure PB changes, a change in the secondary pressure PSEC formed by the secondary regulator valve 606 is minimized. The detailed description will be provided below.

As described above, the first modulator hydraulic pressure PM1 is formed by the first modulator valve 608. More specifically, the first modulator hydraulic pressure PM1 is formed based on the brake pressure PB in such a manner that the first modulator hydraulic pressure PM1 is increased as the brake pressure PB increases. The first modulator hydraulic pressure PM1 is formed in this manner in order to set the brake pressure PM that is supplied to the hydraulic servo 3B of the reverse brake B 1 to a high value when the vehicle backs up, that is, when the shift lever 9 is in Reverse position "R".

When only the first modulator hydraulic pressure PM1 is introduced into the secondary regulator valve 606 as the pilot pressure, if the first modulator hydraulic pressure PM1 increases when the vehicle backs up, the pilot pressure that opposes the hydraulic pressure that is introduced into the feedback port 667 increases. Therefore, when the vehicle backs up, the secondary pressure PSEC that is formed by the secondary regulator valve 606 increases. As a result, the durability of the torque converter 2 may be reduced.

In the second embodiment of the invention, when the vehicle moves forward, that is, when the shift lever 9 is in Drive position "D", the first modulator hydraulic pressure PM1 and the brake pressure PB are introduced into the secondary regulator valve 606 as the pilot pressures. The first modulator hydraulic pressure PM1 is maintained at the lowest pressure, and the brake pressure PB is zero. Therefore, the resultant of the pilot pressures applied to the spool 661 does not change.

If the reverse brake B1 is in the transition to application when the vehicle backs up, the brake pressure PB gradually increases, and the first modulator hydraulic pressure PM1, which is formed using the brake pressure PB as the pilot pressure, also gradually increases. Therefore, the first modulator hydraulic pressure PM1 that is introduced into the first control hydraulic pressure port 665 and the brake pressure PB that is introduced into the second control hydraulic pressure port 666 are applied to the spool 661 in such a manner that an increase in the first modulator hydraulic pressure PM1 and an increase in the brake pressure PB cancel each other. Thus, it is possible to minimize a change in the resultant of the pilot pressures applied to the spool 661. Therefore, it is possible to minimize a change in the secondary pressure PSEC, and to minimize reduction in the durability of the torque converter 2.

If the reverse brake B1 is fully applied when the vehicle backs up, the brake pressure PB and the first modulator hydraulic pressure PM1 are equal to each other. Therefore, the first modulator hydraulic pressure PM1 that is introduced into the first control hydraulic pressure port 665 and the brake pressure PB that is introduced into the second control hydraulic pressure port 666 are applied to the spool 661 in such a manner that the first modulator hydraulic pressure PM1 and the brake pressure PB cancel each other. Thus, a change in the resultant of the pilot pressures applied to the spool 661 is minimized. Therefore, it is possible to minimize an increase in the secondary pressure PSEC, and to minimize reduction in the durability of the torque converter 2. The first modulator hydraulic pressure PM1 and the brake pressure PB are equal to each other. However, there is a predetermined difference between the pressure-receiving area of the portion of the spool 661, which receives the first modulator hydraulic pressure PM1, and the pressure-receiving area of the portion of the spool 661, which receives the brake pressure PB. Accordingly, the secondary pressure PSEC is formed based on the difference in the pressure-receiving area.

The embodiments of the invention have been described above. However, various modifications may be made to the embodiments of the invention.

The combination of the two pilot pressures that are introduced into the secondary regulator valve is not limited to the combinations described above. The combinations other than the combinations in the embodiments of the invention described above may be employed. In this case, a preferable combination is a combination with which when one of the pilot pressures changes, the other pilot pressure changes in such a manner that a change in the resultant of the pilot pressures applied to the spool is minimized.

More specifically, when two pilot pressures are applied to the spool in the same direction, as the one of the pilot pressures increases, the other pilot pressure decreases. On the other hand, when two pilot pressures are applied to the spool in the opposite directions, as the one of the pilot pressures increases, the other pilot pressure increases.

Three or more pilot pressures may be introduced into the secondary regulator valve. For example, when the number of pilot pressures is three, the first embodiment and the second embodiment may be combined with each other. In this case, the secondary regulator valve and the first modulator valve that forms the first modulator hydraulic pressure PM1 may be configured as follows. That is, the secondary regulator valve is configured to operate using the first modulator hydraulic pressure PM1, the control hydraulic pressure PDSU from the duty solenoid (DSU) and the brake pressure PB as the pilot pressures to form the secondary pressure PSEC. More specifically, in the secondary regulator valve, the spool slides in the up-down direction based on a balance between i) a resultant of a force of the first modulator hydraulic pressure PM1, the force being applied to the spool, a force of the control hydraulic pressure PDSU from the duty solenoid (DSU), the force being applied to the spool, and an elastic force of the spring, and ii) a resultant of a force of the brake pressure PB, the force being applied to the spool, and a force of the hydraulic pressure introduced into the feedback port, the force being applied to the spool.

The first modulator valve operates using the control hydraulic pressure PDSU from the duty solenoid (DSU) and the brake pressure PB as the pilot pressures. As in the first embodiment of the invention, as the control hydraulic pressure PDSU from the duty solenoid (DSU) increases, the first modulator hydraulic pressure PM1 is set to a lower value. As in the second embodiment of the invention, as the brake pressure PB increases, the first modulator hydraulic pressure PM1 is set to a higher value. With this configuration, it is possible to minimize the clutch pressure PC when the vehicle moves forward, and to increase the brake pressure PB when the vehicle backs up. In addition, it is possible to minimize a change in the secondary pressure PSEC.

In the description above, the automatic transmission provided in the power transmission system is the belt continuously variable transmission. Alternatively, the automatic transmission may be a planetary gear transmission in which the speed ratio (gear ratio) is automatically set with the use of friction application elements such as a brake and a planetary gear unit.

In the description above, the invention is applied to the power transmission system for a vehicle that includes a gasoline engine. However, the invention may be applied to a power transmission system for a vehicle that includes another type of engine, for example, a diesel engine. A power source for a vehicle may be an engine (internal combustion engine), an electric motor, or a hybrid power source that includes both an engine and an electric motor.

The invention may be applied not only to a FF (front-engine front-drive) engine but also to a FR (front-engine rear-drive) vehicle and a four-wheel drive vehicle.

What is claimed is:

1. A hydraulic pressure control apparatus, comprising:
a first regulation unit that regulates a pressure discharged from an oil pump to form a line pressure that is used as an original pressure for a hydraulic pressure that is supplied to each element; and
a second regulation unit that is provided downstream of the first regulation unit, and that regulates a hydraulic pressure downstream of the first regulation unit to form a secondary pressure, wherein
at least two pilot pressures are supplied to the second regulation unit, and
the second regulation unit is configured in such a manner that when one of the pilot pressures changes, a change in the one of the pilot pressures is absorbed by the other pilot pressure, and wherein the second regulation unit includes a spool that is moved based on the pilot pressure and a hydraulic pressure that is supplied to a port which is communicated with an oil passage located downstream of the first regulation unit, and when one of the pilot pressures changes, the other pilot pressure changes in such a manner that a change in a resultant of the pilot pressures applied to the spool is minimized.

2. The hydraulic pressure control apparatus according to claim 1, wherein when the one of the pilot pressures and the other pilot pressure are applied to the spool in a same direction, the other pilot pressure decreases as the one of the pilot pressures increases.

3. The hydraulic pressure control apparatus according to claim 1, wherein when the one of the pilot pressures and the other pilot pressure are applied to the spool in opposite directions, the other pilot pressure increases as the one of the pilot pressures increases.

4. A hydraulic pressure control apparatus comprising:
a first regulation unit that regulates a pressure discharged from an oil pump to form a line pressure that is used as an original pressure for a hydraulic pressure that is supplied to each element; and
a second regulation unit that is provided downstream of the first regulation unit, and that regulates a hydraulic pressure downstream of the first regulation unit to form a secondary pressure, wherein
at least two pilot pressures are supplied to the second regulation unit, and
the second regulation unit is configured in such a manner that when one of the pilot pressures changes, a change in the one of the pilot pressures is absorbed by the other pilot pressure; and
the one of the pilot pressures is one of an application maintaining hydraulic pressure that is supplied to a hydraulically-driven friction application element, which is applied to form a power transmission path when a vehicle moves, when the hydraulically-driven friction application element is fully applied, and a control hydraulic pressure from an electromagnetic valve that controls an application pressure for a hydraulically-driven lockup clutch that is provided for a fluid power transmission unit provided between a power source and an automatic transmission and that directly connects a power source-side portion and an automatic transmission-side portion of the fluid power transmission unit to each other; and
the other pilot pressure is the other of the application maintaining hydraulic pressure and the control hydraulic pressure.

5. The hydraulic pressure control apparatus according to claim 4, wherein the secondary pressure is supplied to a control valve that is actuated when an application/release state of the lockup clutch is controlled.

6. The hydraulic pressure control apparatus according to claim 4, wherein the application maintaining hydraulic pressure serves also as an original pressure for a linear electromagnetic valve provided in the hydraulic pressure control apparatus.

7. The hydraulic pressure control apparatus according to claim 6, wherein an oil passage that is communicated with a drain port of the second regulation unit is connected to an oil passage between the oil pump and an oil inlet.

8. A hydraulic pressure control apparatus comprising:
a first regulation unit that regulates a pressure discharged from an oil pump to form a line pressure that is used as an original pressure for a hydraulic pressure that is supplied to each element; and
a second regulation unit that is provided downstream of the first regulation unit, and that regulates a hydraulic pressure downstream of the first regulation unit to form a secondary pressure, wherein
at least two pilot pressures are supplied to the second regulation unit, and
the second regulation unit is configured in such a manner that when one of the pilot pressures changes, a change in the one of the pilot pressures is absorbed by the other pilot pressure; and
the one of the pilot pressures is one of an application maintaining hydraulic pressure that is supplied to a first hydraulically-driven friction application element, which is applied to form a power transmission path when a vehicle moves forward, when the first hydraulically-driven friction application element is fully applied, and a hydraulic pressure that is supplied to a second hydraulically-driven friction application element when the vehicle backs up; and
the other pilot pressure is the other of the application maintaining hydraulic pressure and the hydraulic pressure that is supplied to the second hydraulically-driven friction application element.

9. The hydraulic pressure control apparatus according to claim 8, wherein the application maintaining hydraulic pressure serves also as an original pressure for a linear electromagnetic valve provided in the hydraulic pressure control apparatus.

10. The hydraulic pressure control apparatus according to claim 9, wherein an oil passage that is communicated with a drain port of the second regulation unit is connected to an oil passage between the oil pump and an oil inlet.

* * * * *

UNITED STATES PATENT AND TRADEMARK OFFICE
CERTIFICATE OF CORRECTION

PATENT NO. : 8,202,197 B2
APPLICATION NO. : 12/429481
DATED : June 19, 2012
INVENTOR(S) : Yusuke Ogata et al.

It is certified that error appears in the above-identified patent and that said Letters Patent is hereby corrected as shown below:

In the Specifications:

At column 6, line number 34, Delete "HG2", Insert -- FIG. 2 --

At column 7, line number 59, Delete "HG3", Insert -- FIG. 3 --

At column 11, line number 13, Delete "Y", Insert -- $\gamma$ --

Figure 5:
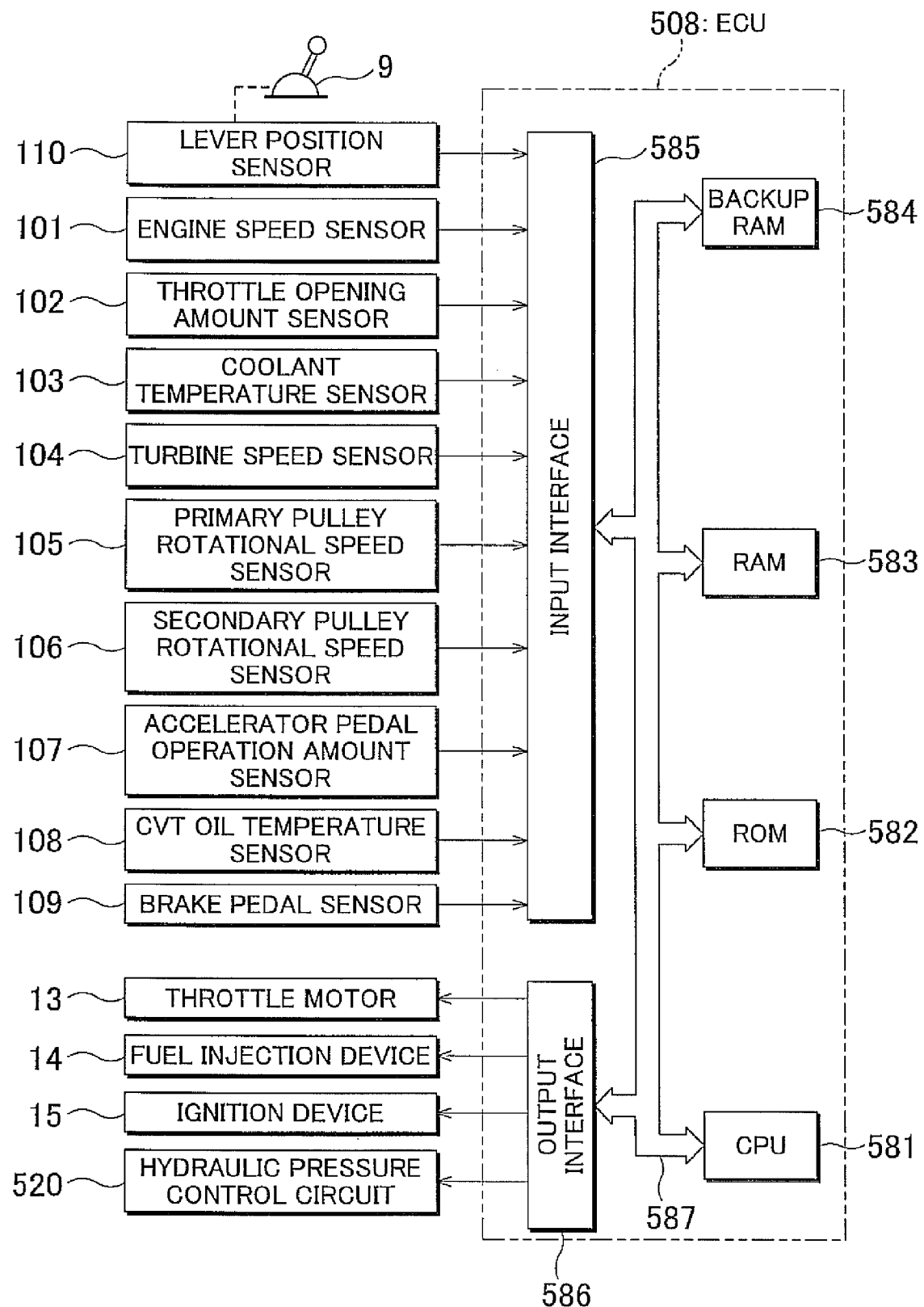
FIG. 5 is a block diagram showing the configuration of a control system, for example, an ECU of the vehicle in FIG. 4.

At column 19, line number 48, Delete "HG5", Insert -- FIG. 5 --

At column 20, line number 14, Delete "HG6", Insert -- FIG. 6 --

At column 20, line number 55, Delete "HG6", Insert -- FIG. 6 --

Signed and Sealed this
Twenty-third Day of April, 2013

Teresa Stanek Rea
*Acting Director of the United States Patent and Trademark Office*